(12) United States Patent
Forenza et al.

(10) Patent No.: US 8,989,155 B2
(45) Date of Patent: Mar. 24, 2015

(54) SYSTEMS AND METHODS FOR WIRELESS BACKHAUL IN DISTRIBUTED-INPUT DISTRIBUTED-OUTPUT WIRELESS SYSTEMS

(71) Applicants: Antonio Forenza, Palo Alto, CA (US); Stephen G. Perlman, Palo Alto, CA (US)

(72) Inventors: Antonio Forenza, Palo Alto, CA (US); Stephen G. Perlman, Palo Alto, CA (US)

(73) Assignee: Rearden, LLC, San Francisco, CA (US)

( * ) Notice: Subject to any disclaimer, the term of this patent is extended or adjusted under 35 U.S.C. 154(b) by 0 days.

(21) Appl. No.: 13/633,702

(22) Filed: Oct. 2, 2012

(65) Prior Publication Data
US 2013/0039168 A1 Feb. 14, 2013

Related U.S. Application Data

(63) Continuation-in-part of application No. 13/475,598, filed on May 18, 2012, which is a continuation-in-part of application No. 13/464,648, filed on May 4, 2012, which is a continuation-in-part of application No. (Continued)

(51) Int. Cl.
*H04W 4/00* (2009.01)
*H04B 7/02* (2006.01)
(Continued)

(52) U.S. Cl.
CPC ............ *H04B 7/022* (2013.01); *H04B 7/0452* (2013.01); *H04B 7/066* (2013.01)
USPC .......................................... 370/334; 455/500

(58) Field of Classification Search
CPC .............................. H04B 7/0452; H04B 7/066
USPC ............... 370/221, 328, 329, 338, 347, 349; 455/422.1, 452.2, 278.1, 279.1, 272, 455/500, 501, 562.1
See application file for complete search history.

(56) References Cited

U.S. PATENT DOCUMENTS

| 4,253,193 A | 2/1981 | Kennard et al. |
| 4,564,935 A | 1/1986 | Kaplan |

(Continued)

FOREIGN PATENT DOCUMENTS

| EP | 1359683 | 11/2003 |
| EP | 2244390 | 10/2010 |

(Continued)

OTHER PUBLICATIONS

R. A. Monziano and T. W. Miller, Introduction to Adaptive Arrays, New York: Wiley, 1980.

(Continued)

*Primary Examiner* — Ajay Cattungal
(74) *Attorney, Agent, or Firm* — Blakely, Sokoloff, Taylor & Zafman LLP

(57) ABSTRACT

Systems and methods are described for wireless backhaul in a multiple antenna system (MAS) with multi-user (MU) transmissions ("MU-MAS"). For example, a multiuser (MU) multiple antenna system (MAS) of one embodiment comprises: one or more centralized units communicatively coupled to multiple distributed transceiver stations via a network; the network consisting of wireline or wireless links or a combination of both, employed as a backhaul communication channel; the centralized unit transforming the N streams of information into M streams of bits, each stream of bits being a combination of some or all N streams of information; the M streams of bits being sent over the network to the distributed transceiver stations; the distributed transceiver stations simultaneously sending the streams of bits over wireless links to at least one client device such that at least one client device receives at least one of the original N streams of information.

17 Claims, 14 Drawing Sheets
(3 of 14 Drawing Sheet(s) Filed in Color)

Related U.S. Application Data

12/917,257, filed on Nov. 1, 2010, now Pat. No. 8,542,763, which is a continuation-in-part of application No. 12/802,988, filed on Jun. 16, 2010, which is a continuation-in-part of application No. 12/802,976, filed on Jun. 16, 2010, now Pat. No. 8,170,081, which is a continuation-in-part of application No. 12/802,974, filed on Jun. 16, 2010, which is a continuation-in-part of application No. 12/802,989, filed on Jun. 16, 2010, which is a continuation-in-part of application No. 12/802,958, filed on Jun. 16, 2010, which is a continuation-in-part of application No. 12/802,975, filed on Jun. 16, 2010, which is a continuation-in-part of application No. 12/802,938, filed on Jun. 16, 2010, now Pat. No. 8,571,086, which is a continuation-in-part of application No. 12/630,627, filed on Dec. 3, 2009, which is a continuation-in-part of application No. 11/894,394, filed on Aug. 20, 2007, now Pat. No. 7,599,420, which is a continuation-in-part of application No. 11/894,362, filed on Aug. 20, 2007, now Pat. No. 7,633,994, which is a continuation-in-part of application No. 11/894,540, filed on Aug. 20, 2007, now Pat. No. 7,636,381.

(51) Int. Cl.
*H04B 7/04* (2006.01)
*H04B 7/06* (2006.01)

(56) References Cited

U.S. PATENT DOCUMENTS

| | | | | |
|---|---|---|---|---|
| 5,088,091 | A * | 2/1992 | Schroeder et al. | 370/406 |
| 5,095,500 | A | 3/1992 | Tayloe et al. | |
| 5,472,467 | A | 12/1995 | Pfeffer et al. | |
| 5,809,422 | A * | 9/1998 | Raleigh et al. | 455/449 |
| 5,838,671 | A | 11/1998 | Ishikawa et al. | |
| 5,872,814 | A | 2/1999 | McMeekin et al. | |
| 5,950,124 | A * | 9/1999 | Trompower et al. | 455/422.1 |
| 5,983,104 | A | 11/1999 | Wickman et al. | |
| 6,252,912 | B1 | 6/2001 | Salinger | |
| 6,400,761 | B1 | 6/2002 | Smee et al. | |
| 6,411,612 | B1 | 6/2002 | Halford et al. | |
| 6,442,151 | B1 | 8/2002 | H'mimy et al. | |
| 6,445,910 | B1 * | 9/2002 | Oestreich | 455/277.1 |
| 6,459,900 | B1 | 10/2002 | Scheinert | |
| 6,473,467 | B1 | 10/2002 | Wallace et al. | |
| 6,718,180 | B1 * | 4/2004 | Lundh et al. | 455/522 |
| 6,760,388 | B2 | 7/2004 | Ketchum et al. | |
| 6,771,706 | B2 | 8/2004 | Ling et al. | |
| 6,785,341 | B2 | 8/2004 | Walton et al. | |
| 6,791,508 | B2 | 9/2004 | Berry et al. | |
| 6,801,580 | B2 | 10/2004 | Kadous | |
| 6,804,311 | B1 | 10/2004 | Dabak et al. | |
| 6,862,271 | B2 | 3/2005 | Medvedev et al. | |
| 6,888,809 | B1 * | 5/2005 | Foschini et al. | 370/334 |
| 6,920,192 | B1 | 7/2005 | Laroia et al. | |
| 6,978,150 | B2 * | 12/2005 | Hamabe | 455/522 |
| 7,006,043 | B1 | 2/2006 | Nalbandian | |
| 7,013,144 | B2 | 3/2006 | Yamashita et al. | |
| 7,072,413 | B2 | 7/2006 | Walton et al. | |
| 7,072,693 | B2 | 7/2006 | Farlow et al. | |
| 7,075,438 | B2 | 7/2006 | Kent et al. | |
| 7,116,723 | B2 | 10/2006 | Kim et al. | |
| 7,139,527 | B2 | 11/2006 | Tamaki et al. | |
| 7,142,154 | B2 * | 11/2006 | Quilter et al. | 342/357.31 |
| 7,154,936 | B2 | 12/2006 | Bjerke et al. | |
| 7,154,960 | B2 | 12/2006 | Liu et al. | |
| 7,167,684 | B2 | 1/2007 | Kadous et al. | |
| 7,197,082 | B2 | 3/2007 | Alexiou et al. | |
| 7,197,084 | B2 | 3/2007 | Ketchum | |
| 7,242,724 | B2 | 7/2007 | Alexiou et al. | |
| 7,248,879 | B1 | 7/2007 | Walton et al. | |
| 7,272,294 | B2 | 9/2007 | Zhou et al. | |
| 7,310,680 | B1 | 12/2007 | Graham et al. | |
| 7,333,540 | B2 | 2/2008 | Yee | |
| 7,369,876 | B2 | 5/2008 | Lee et al. | |
| 7,373,133 | B2 * | 5/2008 | Mickle et al. | 455/343.1 |
| 7,412,212 | B2 | 8/2008 | Hottinen | |
| 7,418,053 | B2 | 8/2008 | Perlman et al. | |
| 7,437,177 | B2 | 10/2008 | Ozluturk et al. | |
| 7,486,931 | B2 | 2/2009 | Cho et al. | |
| 7,502,420 | B2 | 3/2009 | Ketchum | |
| 7,548,752 | B2 | 6/2009 | Sampath et al. | |
| 7,558,575 | B2 | 7/2009 | Losh et al. | |
| 7,599,420 | B2 | 10/2009 | Forenza et al. | |
| 7,630,337 | B2 | 12/2009 | Zheng et al. | |
| 7,633,944 | B1 | 12/2009 | Chang et al. | |
| 7,633,994 | B2 | 12/2009 | Forenza et al. | |
| 7,636,381 | B2 | 12/2009 | Forenza et al. | |
| 7,688,789 | B2 | 3/2010 | Pan et al. | |
| 7,729,433 | B2 | 6/2010 | Jalloul et al. | |
| 7,729,443 | B2 | 6/2010 | Fukuoka et al. | |
| 7,751,843 | B2 | 7/2010 | Butala | |
| 8,041,362 | B2 | 10/2011 | Li et al. | |
| 8,081,944 | B2 * | 12/2011 | Li | 455/278.1 |
| 8,126,510 | B1 | 2/2012 | Samson et al. | |
| 2002/0027985 | A1 * | 3/2002 | Rashid-Farrokhi | 379/417 |
| 2002/0142723 | A1 * | 10/2002 | Foschini et al. | 455/59 |
| 2002/0168017 | A1 * | 11/2002 | Berthet et al. | 375/267 |
| 2002/0181444 | A1 * | 12/2002 | Acampora | 370/352 |
| 2002/0193146 | A1 * | 12/2002 | Wallace et al. | 455/562 |
| 2003/0003863 | A1 | 1/2003 | Thielecke et al. | |
| 2003/0012315 | A1 * | 1/2003 | Fan | 375/349 |
| 2003/0036359 | A1 | 2/2003 | Dent et al. | |
| 2003/0043929 | A1 | 3/2003 | Sampath | |
| 2003/0048753 | A1 | 3/2003 | Jalali | |
| 2003/0114165 | A1 * | 6/2003 | Mills | 455/453 |
| 2003/0125026 | A1 | 7/2003 | Tsunehara et al. | |
| 2003/0125040 | A1 | 7/2003 | Walton et al. | |
| 2003/0147362 | A1 * | 8/2003 | Dick et al. | 370/324 |
| 2003/0156056 | A1 | 8/2003 | Perry | |
| 2003/0161282 | A1 | 8/2003 | Medvedev et al. | |
| 2003/0211843 | A1 * | 11/2003 | Song et al. | 455/411 |
| 2003/0214431 | A1 | 11/2003 | Hager et al. | |
| 2003/0222820 | A1 * | 12/2003 | Karr et al. | 342/457 |
| 2003/0223391 | A1 * | 12/2003 | Malaender et al. | 370/334 |
| 2003/0235146 | A1 | 12/2003 | Wu et al. | |
| 2004/0002835 | A1 * | 1/2004 | Nelson | 702/188 |
| 2004/0008650 | A1 * | 1/2004 | Le et al. | 370/338 |
| 2004/0043784 | A1 | 3/2004 | Czaja et al. | |
| 2004/0097197 | A1 | 5/2004 | Juncker et al. | |
| 2004/0136349 | A1 * | 7/2004 | Walton et al. | 370/338 |
| 2004/0170430 | A1 * | 9/2004 | Gorokhov | 398/41 |
| 2004/0176097 | A1 | 9/2004 | Wilson et al. | |
| 2004/0179627 | A1 | 9/2004 | Ketchum et al. | |
| 2004/0185909 | A1 | 9/2004 | Alexiou et al. | |
| 2004/0190636 | A1 | 9/2004 | Oprea | |
| 2004/0252632 | A1 | 12/2004 | Bourdoux et al. | |
| 2005/0003865 | A1 | 1/2005 | Lastinger et al. | |
| 2005/0020237 | A1 | 1/2005 | Alexiou | |
| 2005/0031047 | A1 | 2/2005 | Maltsev et al. | |
| 2005/0041750 | A1 | 2/2005 | Lau | |
| 2005/0041751 | A1 | 2/2005 | Nir et al. | |
| 2005/0043031 | A1 | 2/2005 | Cho et al. | |
| 2005/0047515 | A1 | 3/2005 | Walton et al. | |
| 2005/0058217 | A1 | 3/2005 | Sandhu | |
| 2005/0075110 | A1 | 4/2005 | Posti et al. | |
| 2005/0101259 | A1 | 5/2005 | Tong et al. | |
| 2005/0111406 | A1 | 5/2005 | Pasanen et al. | |
| 2005/0111599 | A1 * | 5/2005 | Walton et al. | 375/347 |
| 2005/0157683 | A1 * | 7/2005 | Ylitalo et al. | 370/334 |
| 2005/0169396 | A1 | 8/2005 | Baier et al. | |
| 2005/0259627 | A1 * | 11/2005 | Song et al. | 370/342 |
| 2005/0271009 | A1 | 12/2005 | Shirakabe et al. | |
| 2005/0287962 | A1 * | 12/2005 | Mehta et al. | 455/101 |
| 2006/0050804 | A1 | 3/2006 | Leclair | |
| 2006/0146755 | A1 | 7/2006 | Pan et al. | |
| 2006/0270359 | A1 * | 11/2006 | Karmi et al. | 455/69 |
| 2006/0287743 | A1 | 12/2006 | Sampath et al. | |
| 2007/0082674 | A1 | 4/2007 | Pedersen | |
| 2007/0099665 | A1 | 5/2007 | Kim | |

(56) References Cited

U.S. PATENT DOCUMENTS

| | | | |
|---|---|---|---|
| 2007/0135125 A1 | 6/2007 | Kim et al. | |
| 2007/0183362 A1 | 8/2007 | Mondal et al. | |
| 2007/0242782 A1 | 10/2007 | Han et al. | |
| 2007/0280116 A1 | 12/2007 | Wang et al. | |
| 2008/0080631 A1* | 4/2008 | Forenza et al. | 375/260 |
| 2008/0102881 A1 | 5/2008 | Han et al. | |
| 2008/0107135 A1 | 5/2008 | Ibrahim | |
| 2008/0117961 A1 | 5/2008 | Han | |
| 2008/0118004 A1* | 5/2008 | Forenza et al. | 375/299 |
| 2008/0125051 A1 | 5/2008 | Kim et al. | |
| 2008/0130790 A1* | 6/2008 | Forenza et al. | 375/299 |
| 2008/0132281 A1 | 6/2008 | Kim et al. | |
| 2008/0181285 A1 | 7/2008 | Hwang et al. | |
| 2008/0205538 A1 | 8/2008 | Han et al. | |
| 2008/0214185 A1 | 9/2008 | Cho et al. | |
| 2008/0227422 A1 | 9/2008 | Hwang et al. | |
| 2008/0232394 A1 | 9/2008 | Kozek et al. | |
| 2008/0239938 A1 | 10/2008 | Jalloul et al. | |
| 2008/0260054 A1 | 10/2008 | Myung et al. | |
| 2009/0016463 A1* | 1/2009 | Roh | 375/295 |
| 2009/0060013 A1 | 3/2009 | Ashikhmin et al. | |
| 2009/0067402 A1 | 3/2009 | Forenza et al. | |
| 2009/0135944 A1 | 5/2009 | Dyer et al. | |
| 2009/0202016 A1 | 8/2009 | Seong et al. | |
| 2009/0207822 A1 | 8/2009 | Kim et al. | |
| 2009/0209206 A1 | 8/2009 | Zou et al. | |
| 2009/0227249 A1 | 9/2009 | Ylitalo | |
| 2009/0285156 A1 | 11/2009 | Huang et al. | |
| 2010/0034151 A1 | 2/2010 | Alexiou | |
| 2010/0098030 A1 | 4/2010 | Wang et al. | |
| 2010/0172309 A1 | 7/2010 | Forenza et al. | |
| 2010/0195527 A1 | 8/2010 | Gorokhov et al. | |
| 2010/0220679 A1 | 9/2010 | Abraham et al. | |
| 2010/0316163 A1* | 12/2010 | Forenza et al. | 375/296 |
| 2011/0002371 A1* | 1/2011 | Forenza et al. | 375/227 |
| 2011/0002410 A1* | 1/2011 | Forenza et al. | 375/267 |
| 2011/0002411 A1* | 1/2011 | Forenza et al. | 375/267 |
| 2011/0003606 A1* | 1/2011 | Forenza et al. | 455/501 |
| 2011/0003607 A1* | 1/2011 | Forenza et al. | 455/501 |
| 2011/0003608 A1* | 1/2011 | Forenza et al. | 455/501 |
| 2011/0044193 A1* | 2/2011 | Forenza et al. | 370/252 |
| 2011/0142020 A1 | 6/2011 | Kang et al. | |
| 2011/0142104 A1 | 6/2011 | Coldrey et al. | |
| 2011/0199946 A1 | 8/2011 | Breit et al. | |
| 2012/0151305 A1 | 6/2012 | Zhang et al. | |
| 2012/0300717 A1* | 11/2012 | Lopez et al. | 370/329 |
| 2012/0314570 A1* | 12/2012 | Forenza et al. | 370/230 |
| 2012/0314649 A1* | 12/2012 | Forenza et al. | 370/328 |

FOREIGN PATENT DOCUMENTS

| | | |
|---|---|---|
| JP | 2002-374224 | 12/2001 |
| WO | WO-02/099995 A2 | 12/2002 |
| WO | WO-03094460 | 11/2003 |
| WO | WO-03107582 | 12/2003 |
| WO | WO-2007/114654 | 10/2007 |
| WO | WO-2010/017482 | 2/2010 |

OTHER PUBLICATIONS

Final Office Action from U.S. Appl. No. 12/802,958, mailed Jun. 23, 2014, 24, pages.
Final Office Action from U.S. Appl. No. 12/802,989, mailed Jun. 12, 2014, 17, pages.
Office Action from U.S. Appl. No. 13/475,598, mailed Dec. 30, 2013, 16, pages.
Office Action from U.S. Appl. No. 12/802,975, mailed Aug. 14, 2013, 26, pages.
Final Office Action from U.S. Appl. No. 12/630,627, mailed Apr. 2, 2013, 23, pages.
Office Action from U.S. Appl. No. 10/817,731, mailed Jan. 21, 2009, 23 pgs.
Office Action from U.S. Appl. No. 11/894,394, mailed Oct. 28, 2008, 13 pgs.
Office Action from U.S. Appl. No. 11/894,540, mailed Oct. 29, 2008, 13 pgs.
Office Action from U.S. Appl. No. 11/894,362, mailed Oct. 29, 2008, 17 pgs.
Office Action from U.S. Appl. No. 11/256,478, mailed Sep. 19, 2008, 14 pgs.
Notice of Allowance from U.S. Appl. No. 11/894,394, mailed Jun. 26, 2009, 5 pgs.
Office Action from U.S. Appl. No. 10/817,731, mailed Sep. 11, 2009, 36 pgs.
Notice of Allowance from U.S. Appl. No. 11/894,362, mailed Sep. 3, 2009, 6 pgs.
Notice of Allowance from U.S. Appl. No. 11/894,540, mailed Sep. 14, 2009, 6 pgs.
Notice of Allowance from U.S. Appl. No. 11/256,478, mailed Jan. 26, 2010, 6 pgs.
Office Action from U.S. Appl. No. 10/817,731, mailed Mar. 15, 2010, 26 pages.
Notice of Allowance from U.S. Appl. No. 12/802,976, mailed Nov. 29, 2010, 6 pgs.
Office Action from U.S. Appl. No. 12/630,627, mailed Mar. 16, 2011, 5 pgs.
Notice of Allowance from U.S. Appl. No. 12/802,976, mailed Apr. 14, 2011, 6 pgs.
Office Action from U.S. Appl. No. 12/637,643, mailed Sep. 23, 2011, 18 pgs.
Final Office Action from U.S. Appl. No. 12/802,988, mailed Sep. 5, 2012, 10 pages.
Notice of Allowance from counterpart U.S. Appl. No. 12/802,938 mailed Sep. 19, 2012, 8 pages.
Final Office Action from U.S. Appl. No. 12/802,989, mailed Nov. 27, 2012, 12 pages.
Notice of Allowance from counterpart U.S. Appl. No. 12/802,938 mailed Dec. 6, 2012, 5 pages.
Office Action from U.S. Appl. No. 12/802,974, mailed Dec. 19, 2012, 7 pages.
Office Action from U.S. Appl. No. 12/802,975, mailed Dec. 19, 2012, 16 pages.
Notice of Allowance from counterpart U.S. Appl. No. 12/917,257, mailed Dec. 6, 2012, 8 pages.
Notice of Allowance from counterpart U.S. Appl. No. 12/917,257 mailed Feb. 15, 2013, 18 pages.
Office Action from U.S. Appl. No. 13/464,648, mailed Feb. 12, 2013, 12 pages.
Office Action from U.S. Appl. No. 12/802,988, mailed Apr. 12, 2013, 8 pages.
Notice of Allowance from U.S. Appl. No. 12/917,257 mailed May 31, 2013, 12 pages.
Notice of Allowance from U.S. Appl. No. 12/802,938 mailed May 24, 2013, 10 pages.
Final Office Action from U.S. Appl. No. 12/802,958, mailed Jun. 25, 2013, 48 pages.
Final Office Action from U.S. Appl. No. 13/464,648, mailed Aug. 1, 2013, 10 pages.
Non-Final Office Action from U.S. Appl. No. 12/802,974, mailed Aug. 1, 2013, 35 pages.
Non-Final Office Action from U.S. Appl. No. 12/802,975, mailed on Aug. 14, 2013, 26 pages.
Final Office Action from U.S. Appl. No. 12/802,988, mailed Aug. 2, 2013, 13 pages.
PCT/US2013/061493 Notification of Transmittal of the International Search Report and the Written Opinion of the International Searching Authority, or the Declaration, mailed Dec. 6, 2013, 9 pages.
Office Action from U.S. Appl. No. 12/802,989, mailed Nov. 26, 2013, 27 pages.
Office Action from U.S. Appl. No. 13/464,648, mailed Feb. 14, 2014, 11 pages.
Office Action from U.S. Appl. No. 13/461,682, mailed Feb. 25, 2014, 37 pages.
Office Action from U.S. Appl. No. 14/023,302 mailed Jul. 17, 2014, 37 pages.
Office Action from U.S. Appl. No. 12/802,988, mailed Mar. 24, 2014, 11 pages.

(56) References Cited

OTHER PUBLICATIONS

Final Office Action from U.S. Appl. No. 12/802,974, mailed Aug. 1, 2014, 23 pages.
Final Office Action from U.S. Appl. No. 12/802,975, mailed Aug. 4, 2014, 40 pages.
Final Office Action from U.S. Appl. No. 13/475,598, mailed Aug. 27, 2014, 30 pages.
Office Action from U.S. Appl. No. 14/156,254, mailed Sep. 11, 2014, 44 pages.
Final Office Action from U.S. Appl. No. 12/630,627, mailed Oct. 20, 2011, 13 pgs.
Final Office Action from U.S. Appl. No. 10/817,731, mailed Jul. 9, 2008, 20 pgs.
Office Action from U.S. Appl. No. 10/817,731, mailed Jan. 4, 2008, 13 pgs.
Office Action from U.S. Appl. No. 10/817,731, mailed May 18, 2007, 12 pgs.
Notice of Allowance from U.S. Appl. No. 10/817,731, mailed Sep. 30, 2010, 6 pgs.
Notice of Allowance from U.S. Appl. No. 12/143,503, mailed Aug. 18, 2011, 12 pgs.
Office Action from U.S. Appl. No. 12/143,503, mailed Dec. 9, 2010, 15 pgs.
Office Action from U.S. Appl. No. 11/894,540, mailed Apr. 29, 2009, 5 pgs.
"Airgo—Wireless Without Limits—Homepage", http://www.airgonetworks.com/, printed Apr. 9, 2004, 1.
ArrayComm, "Field-Proven Results", Improving wireless economics through MAS software, printed on Mar. 28, 2011, 3 pages, retrieved from the internet, www.arraycomm.com/serve.php?page=proof.
"Chapter 26—Electromagnetic-Wave Propagation", Reference Data for Radio Engineers, 5th Edition, Howard W. Sams & Co., Inc., (1973), 1-32.
"High Frequency Active Auroroal Research Program—Homepage", http://www.haarp.alaska.edu/, printed Apr. 9, 2004, 1.
"IntelliCell: A Fully Adaptive Approach to Smart Antennas", ArrayComm, Incorporated, WP-ISA-031502-2.0, (2002), 1-18.
"MIMO System uses SDMA for IEEE802.11n", Electronicstalk, http://www.electronicstalk.com/news/ime/ime149.html, (Jul. 14, 2004), 1-3.
"Vivato—Homepage", http://www.vivato.net/, printed Apr. 9, 2004, 1.
3GPP TR 25.876 V7.0.0 (Mar. 2007), Technical Report, 3rd Generation Partnership Project; Technical Specification Group Radio Access Network; Multiple Input Multiple Output in UTRA; (Release 7), pp. 2-76.
3GPP TS 36.211 V8.7.0 (May 2009) Technical Specification, 3rd Generation Partnership Project; Technical Specification Group Radio Access Network; Evolved Universal Terrestrial Radio Access (E-UTRA); Physical Channels and Modulation (Release 8), pp. 1-83.
3GPP, ETSI 136 212 V9.1.0 (2010-, Technical Specification, LTE; Evolved Universal Terrestrial Radio Access (E-UTRA); Multiplexing and Channel Coding (3GPP TS 36.212 Verion 9.1.0 Release 9) pp. 63.
3GPP, TS 36.212.V8.7.0 (May 2009), Technical Specification, 3rd Generation Partnership Project; Technical Specification Group Radio Access Network; Evolved Universal Terrestrial Radio Access (E-UTRA); "Multiplexing and channel Coding" (Release 8), pp. 60.
Abbasi, N, et al., "Capacity estimation of HF-MIMO systems", International Conference on Ionospheric Systems and Techniques, Apr. 2009, pp. 5.
Arraycomm, Improving Wireless Economics Through MAS Software, printed on Mar. 8, 2011, pp. 1-3, http://www.arraycomm.com/serve.php?page+proof.
Benedetto, M.D., et al., "Analysis of the effect of the I/Q baseband filter mismatch in an OFDM modem", Wireless personal communications, (2000), 175-186.
Bengtsson, M, "A Pragmatic Approach To Multi-User Spatial Multiplexing", IEEE 2002, pp. 130-134.

Besson, O., et al., "On parameter estimation of MIMO flat-fading channels with frequency offsets", Signal Processing, IEEE Transactions on [see also Acoustics, Speech, and Signal Processing, IEEE Transactions on], vol. 51, No. 3, (Mar. 2003), 602-613.
Caire, et al., "On Achivalbe Rates in a Multi-Antenna Broadcast Downlink", IEEE Trans. Info. Th., vol. 49, pp. 1691-1706, Jul. 2003.
Catreux, Severine, et al., "Adaptive modulation and MIMO coding for broadband wireless data networks", IEEE Comm. Mag., vol. 2, (Jun. 2002), 108-115.
Chen, Runhua, et al., "Multiuser Space-Time Block Coded MIMO System with Downlink Precoding", IEEE Communications Society, 2004, pp. 2689-2693.
Chen, Runhua, et al., "Transmit selection diversity for unitary precoded multiuser spatial multiplexing systems with linear receivers", accepted to IEEE Trans. on Signal Processing, (Aug. 2005), 1-30.
Choi, L.U., et al., "A transmit preprocessing technique for multiuser MIMO systems using a decomposition approach", IEEE Trans. Wireless Comm., vol. 3, (Jan. 2004), 20-24.
Choi, Wan, et al., "Opportunistic space division multiple access with beam selection", to appear in IEEE Trans. on Communications, (May 19, 2006), 1-23.
Chu, D, et al., "Polyphase codes with good periodic correlation properties (corresp.)", IEEE Trans. Inform. Theory, vol. 18, No. 4, (Jul. 1972), 531-532.
Costa, "Writing on Dirty Paper", IEEE Transactions On Information Theory, vol. IT- 29, No. 3, May 1983, pp. 439-441.
Coulson, J, et al., "Maximum likelihood synchronization for OFDM using a pilot symbol: analysis", IEEE J. Select. Areas Commun., vol. 19, No. 12, (Dec. 2001), 2495-2503.
Dai, X, et al., "Carrier frequency offset estimation for OFDM/SDMA systems using consecutive pilots", IEEE Proceedings-Communications, vol. 152, (Oct. 2005), 624-632.
Daniel, J, "Introduction to public safety: RF Signal Distribution Using Fiber Optics", 2009, pp. 13, http://www.rfsolutions.com/fiber.pdf.
Devasirvatham, et al., "Time Delay Spread Measurements At 850 MHz and 1 7 GHz Inside A Metropolitan Office Building", Electronics Letters, Feb. 2, 1989, vol. 25, No. 3, pp. 194-196.
Devasirvatham, et al., Radio Propagation Measurements At 850MHz. 1.7GHz and 4GHz Inside Two Dissimilar Office Buildings, Electronics Letter Mar. 29, 1990 vol. 26 No. 7, pp. 445-447.
Devasirvatham, et al., "Time Delay Spread and Signal Level Measurements of 850 MHz Radio Waves in Building Environments", IEEE Transactions on Antennas and Propagation, vol. AP-34, No. 11, Nov. 1986.
Dietrich, Carl B., et al., "Spatial, polarization, and pattern diversity for wireless handheld terminals", Proc. IEEE Antennas and Prop. Symp., vol. 49, (Sep. 2001), 1271-1281.
Ding, P, et al., "On The Sum Rate Of Channel Subspace Feedback for Multi-Antenna Broadcast Channels," in Proc., IEEE Globecom, vol. 5, pp. 2699-2703, Nov. 2005.
Dohler, Mischa, et al., "A Step Towards MIMO: Virtual Antenna Arrays", European Cooperation in the Field of Scientific and Technical Research, (Jan. 15-17, 2003), 9.
Dong, Liang, et al., "Multiple-input multiple-output wireless communication systems using antenna pattern diversity", Proc. IEEE Glob. Telecom. Conf., vol. 1, (Nov. 2002), 997-1001.
Fakhereddin, M.J., et al., "Combined effect of polarization diversity and mutual coupling on MIMO capacity", Proc. IEEE Antennas and Prop. Symp., vol. 2, (Jun. 2003), 495-498.
Fella, Adlane, "Adaptive WiMAX Antennas: The promise of higher ROI", http://www.wimax.com/commentary/spotlight/spotlight8-08-2005/?searchterm=Adlane Fella, printed May 9, 2008, 1-3.
Fletcher, P.N., et al., "Mutual coupling in multi-element array antennas and its influence on MIMO channel capacity", IEEE Electronics Letters, vol. 39, (Feb. 2003), 342-344.
Forenza, Antonio, et al., "Adaptive MIMO transmission for exploiting the capacity of spatially correlated channels", IEEE Trans. on Veh. Tech., vol. 56, n. 2, (Mar. 2007), 619-630.

(56) References Cited

OTHER PUBLICATIONS

Forenza, Antonio, et al., "Benefit of Pattern Diversity Via 2-element Array of Circular Patch Antennas in Indoor Clustered MIMO Channels'", IEEE Trans. on Communications, vol. 54, No. 5, (May 2006), 943-954.

Forenza, Antonio, et al., "Impact of antenna geometry on MIMO communication in indoor clustered channels", Proc. IEEE Antennas and Prop. Symp., vol. 2, (Jun. 2004), 1700-1703.

Forenza, Antonio, et al., "Switching Between OSTBC and Spatial Multiplexing with Linear Receivers in Spatially Correlated MIMO Channels", IEEE, (2006), 1-5.

Foschini, G.J., et al., "Simplified processing for high spectral efficiency wireless communication employing multi-element arrays", IEEE Jour. Select. Areas in Comm., vol. 17, No. 11, (Nov. 1999), 1841-1852.

Fusco, T, et al., "Blind Frequency-offset Estimation for OFDM/OQAM Systems", IEEE Transactions on [see also Acoustics, Speech, and Signal Processing, IEEE Transactions on] vol. 55, (2007), 1828-1838.

Garcia, C.R, et al., "Channel Model for Train to Train Communication Using the 400 MHz Band", in Proc. of IEEE Vehicular Technology Conference, pp. 3082-3086, May 2008.

Gesbert, D., et al., "From Theory to Practice: An Overview of MIMO Space—Time Coded Wireless Systems", IEEE Journal On Selected Areas in Communiactions, vol. 21, No. 3, Apr. 2003.

Gesbert, David, et al., "Outdoor MIMO Wireless Channels: Models and Performance Prediction", IEEE Transactions on Communications, vol. 50, No. 12, (Dec. 2002), 1926-1934.

Gesbert, D., et al., "Multi-Cell MIMO Cooperative Networks: A New Look at Interference" IEEE Joural on Selected Areas In Communications, vol. 28, No. 9, Dec. 1, 2010, 30 pages.

Ghogho, M, et al., "Training design for multipath channel and frequency offset estimation in MIMO systems", Signal Processing, IEEE Transactions on [see also Acoustics, Speech, and Signal Processing, IEEE Transactions on], vol. 54, No. 10, (Oct. 2006), 3957-3965.

Gunashekar, G, et al., "Investigations into the Feasibility of MIMO Techniques within the HF Band: Preliminary Results", Radio Science (Special Issue), 2009, (In Press) 33 pages.

Haring, L., "Residual carrier and sampling frequency synchronization in multiuser OFDM systems", VTC-Spring. IEEE 63rd Vehicular Technology Conference, vol. 4, (2006), 1937-1941.

Heath, Robert W., et al., "Antenna selection for spatial multiplexing systems with linear receivers", IEEE Trans. Comm., vol. 5, (Apr. 2001), 142-144.

Heath, Robert W., et al., "Switching between diversity and multiplexing in MIMO systems", IEEE Trans. Comm., vol. 53, No. 6, (Jun. 2005), 962-968.

Hewlett Packard, "GPS and Precision Timing Applications", Application Note 1272, pp. 1-28.

Jindal, N, "MIMO Broadcast Channels With Finite-Rate Feedback," IEEE Trans. on Info. Theory, vol. 52, pp. 5045-5060, Nov. 2006.

Jose, Jubin, et al., "Channel Estimation and Linear Precoding in Multiuser Multiple-Antenna TDD Systems", IEEE Transactions on Vehicular Technology. Jun. 2011 vol. 60 No. 5, pp. 2102-2116.

Jungnickel, V., et al., "Capacity of MIMO systems with closely spaced antennas", IEEE Comm. Lett., vol. 7 (Aug. 2003), 361-363.

Kannan, T.P, et al., "Separation of cochannel signals under imperfect timing and carrier synchronization", IEEE Trans. Veh. Technol., vol. 50, No. 1, (Jan. 2001), 79-96.

Lang, S, et al., "Design and development of a 5.25 GHz software defined wireless OFDM communication platform", IEEE Communications Magazine, vol. 42, No. 6, (Jun. 2004), 6-12.

Lee, K, et al., "Frequency-offset estimation for MIMO and OFDM systems using orthogonal training sequences", IEEE Trans. Veh. Technol., vol. 56, No. 1, (Jan. 2007), 146-156.

Liu, G., et al., "Time and frequency offset estimation for distributed multiple-input multiple-output orthogonal frequency division multiplexing systems", Institute of Engineering and Technology Communications, vol. 4, Issue 6, 2010, pp. 708-715.

Luise, M, et al., "Carrier frequency acquisition and tracking for Ofdm systems", IEEE Trans. Commun., vol. 44, No. 11, (Nov. 1996), 1590-1598.

Luise, M, et al., "Low-complexity blind carrier frequency recovery for OFDM signals over frequency-selective radio channels", IEEE Trans. Commun., vol. 50, no. 7, (Jul. 2002), 1182-1188.

Mattheijssen, Paul, "Antenna-pattern diversity versus space diversity for use at handhelds", IEEE Trans. on Veh. Technol., vol. 53, (Jul. 2004), 1035-1042.

Mazrouei-Sebdani, Mahmood, et al., "Vector Perturbation Precoding and User Scheduling for Network MIMO", IEEE WCNC 2011, pp. 203-208. ISBN 978-1-61284-254-7.

McKay, Matthew R., et al., "A throughput-based adaptive MIMO BICM approach for spatially correlated channels", to appear in Proc. IEEE ICC, (Jun. 2006), 1-5.

McKay, Matthew R., et al., "Multiplexing/beamforming switching for coded MIMO in spatially correlated Rayleigh channels", IEEE Transactions on Vehicular Technology, vol. 56, No. 5, (Sep. 2007).

McLean, James S., et al., "A re-examination of the fundamental limits on the radiation Q of electrically small antennas", IEEE Trans. Antennas Propagat., vol. 44, n. 5, (May 1996), 672-676.

Minn, et al., "A robust timing and frequency synchronization for OFDM systems", IEEE Trans. Wireless Commun., vol. 2, No. 4, (Jul. 2003), 822-839.

Montgomery, B.G, et al., "Analog RF-over-fiber technology", Syntonics LLC, Jan. 2008, pp. 2-51, http://chesapeakebayaoc.org/documents/Syntonics_AOC_RF_over-Fiber_19_Jan_08.pdf.

Moose, Paul H., et al., "A technique for orthogonal frequency division multiplexing frequency offset correction", IEEE Trans. Commun., vol. 42, No. 10, (Oct. 1994), 2908-2914.

Morelli, M, et al., "An improved frequency offset estimator for OFDM applications", IEEE Commun. Lett., vol. 3, No. 3, (Mar. 1999), 75-77.

Morelli, M, et al., "Frequency ambiguity resolution in OFDM systems", IEEE Commun. Lett., vol. 4, No. 4, (Apr. 2000), 134-136.

Morris, Matthew L., et al., "Network model for MIMO systems with coupled antennas and noisy amplifiers", IEEE Trans. Antennas Propagat., vol. 53 (Jan. 2005), 545-552.

Oberli, C, et al., "Maximum likelihood tracking algorithms for MIMOOFDM," in Communications, IEEE International Conference on, vol. 4, Jun. 20-24, 2004, 2468-2472.

Oda, Y, et al., "Measured Path Loss and Multipath Propagation Characteristics in UHF and Microwave Frequency Bands for Urban Mobile Communications", IEEE, VIC 2001, pp. 337-341.

Pohl, V., et al., "Antenna spacing in MIMO indoor channels", Proc. IEEE Veh. Technol. Conf., vol. 2, (May 2002), 749-753.

Proakis, J, "Digital Communications", Fourth Edition, Department of Electrical and Computer Engineering, Northeastern University, ISBN 0-07-232111-3, Cover page, Title page, Table of Contents, 2001, 9 pages.

"Propagation", printed Oct. 21, 2005, http://home.planet.nl/~alphe078/propagat1.htm, 2 pgs.

Rao, R, et al., "I/Q mismatch cancellation for MIMO-OFDM systems", In Personal, Indoor and Mobile Radio Communications, PIMRC 2004. 15th IEEE International Symposium on, vol. 4, (2004), 2710-2714.

Rao, R.M., et al., "Multi-antenna testbeds for research and education in wireless communications", IEEE Communications Magazine, vol. 42, No. 12, (Dec. 2004), 72-81.

Rappaport, T, Wireless Communications, Principles and Practice, Second Edition, Prentice Hall, 2002, ISBN 0-13-042232-0, Cover page, Title page, Table of Contents, 13 pages.

Schmidl, T.M, et al., "Robust frequency and timing synchronization for OFDM", IEEE Trans. Commun., vol. 45, No. 12, (Dec. 1997), 1613-1621.

Schuchert, S, et al., "A novel I/Q imbalance compensation scheme for the reception of OFDM signals", IEEE Transaction on Consumer Electronics, (Aug. 2001).

Serpedin, E, et al., "Blind channel and carrier frequency offset estimation using periodic modulation precoders", Signal Processing, IEEE Transactions on [see also Acoustics, Speech, and Signal Processing, IEEE Transactions on], vol. 48, No. 8, (Aug. 2000), 2389-2405.

(56) References Cited

OTHER PUBLICATIONS

Sharif, M , et al., "On the capacity of MIMO broadcast channel with partial side information", IEEE Trans. Info. Th., vol. 51, (Feb. 2005), 506-522.

Shen, Zukang, et al., "Low complexity user selection algorithms for multiuser MIMO systems with block diagonalization", accepted for publication in IEEE Trans. Sig. Proc, (Sep. 2005), 1-12.

Shen, Zukang, et al., "Sum capacity of multiuser MIMO broadcast channels with block diagonalization", submitted to IEEE Trans. Wireless Comm., (Ocy. 2005), 1-12.

Shi, K, et al., "Coarse frame and carrier synchronization of OFDM systems: a new metric and comparison", IEEE Trans. Wireless Commun., vol. 3, No. 4, (Jul. 2004), 1271-1284.

Shiu, Da-Shan , et al., "Fading correlation and its effect on the capacity of multielement antenna systems", IEEE Trans. Comm., vol. 48, No. 3, (Mar. 2000), 502-513.

Spencer, Quentin H., et al., "Adaptive Antennas and MIMO Systems for Wireless Communications—An Introduction to the Multi-User MIMI Downlink", IEEE Communications Magazine, (Oct. 2004), 60-67.

Spencer, Quentin H., et al., "Zero-forcing methods for downlink spatial multiplexing in multiuser MIMO channels", IEEE Trans. Sig. Proc., vol. 52 (Feb. 2004), 461-471.

Stoytchev, M., et al., "Compact antenna arrays for MIMO applications", Proc. IEEE Antennas and Prop. Symp., vol. 3 (Jul. 2001), 708-711.

Strangeways, H, "Determination of The Correlation Distance For Spaced Antennas On Multipath HF Links And Implications For Design Of SIMO and MIMO Systems", School of Electronic and Electrical Engineering, University of Leeds, IEEE First European Conf. on Antennas and Prop, www.esaspaceweather.net/spweather/workshops/eswwll/proc/Session3/StrangewaysHFMIMOposter.pdf.

Strangways, H. J., "Investigation of signal correlation for spaced and co-located antennas on multipath hf links and implications for the design of SIMO and MIMO systems", IEEE First European Conf. on Antennas and Propagation (EuCAP 2006), vol., n. 6-10, pp. 1-6, Nov. 2006.

Strohmer, T, et al., "Application of Time-Reversal with MMSE Equalizer to UWB Communications", Proc. of IEEE Globecom, vol. 5, pp. 3123-3127, Nov. 2004.

Syntonics, "FORAX RF-over-fiber Communications Systems", pp. 1-3, printed on Mar. 8, 2011, http://www.syntonicscorp.com/products/products-foraxRF.html.

Tang, T, et al., "Joint frequency offset estimation and interference cancellation for MIMO-OFDM systems [mobile radio]", VTC2004-Fall. 2004 IEEE 60th Vehicular Technology Conference, vol. 3, Sep. 26-29, 2004, 1553-1557.

Tarighat, Alireza, et al., "Compensation schemes and performance analysis of IQ imbalances in OFDM receivers", Signal Processing, IEEE Transactions on [see also Acoustics, Speech, and Signal Processing, IEEE Transactions on], vol. 53, (Aug. 2005), 3257-3268.

Tarighat, et al., "MIMO OFDM receivers for systems with IQ imbalances", IEEE Trans. Sig. Proc., vol. 53, for orthogonal space-time block codes (OSTBC), (Sep. 2005), 3583-3596.

Tarokh, Vahid, et al., "Space-time block codes from orthogonal designs", IEEE Trans. Info. Th., vol. 45, (Jul. 1999), 1456-467.

Tureli, U, et al., "OFDM blind carrier offset estimation: ESPRIT", IEEE Trans. Commun., vol. 48, No. 9, (Sep. 2000), 1459-1461.

Valkama, M, et al., "Advanced methods for I/Q imbalance compensation in communication receivers", IEEE Trans. Sig. Proc., (Oct. 2001).

Van De Beek, Jan-Jaap, et al., "ML estimation of time and frequency offset in OFDM systems", Signal Processing, IEEE Transactions on [see also Acoustics, Speech, and Signal Processing, IEEE Transactions on] vol. 45, No. 7, (Jul. 1997), 1800-1805.

Vaughn, Rodney, et al., "Switched parasitic elements for antenna diversity", IEEE Trans. Antennas Propagat., vol. 47, (Feb. 1999), 399-405.

Vishwanath, S, "Duality, Achievable Rates, And Sum-Rate Capacity Of Gaussian MIMO Broadcast Channels," IEEE Trans. Info. Th., vol. 49, No. 10, pp. 2658-2668, Oct. 2003.

Viswanath, et al., "Sum Capacity of the Vector Gaussian Broadcast Channel and Uplink-Downlink Duality", IEEE Transactions On Information Theory, vol. 49, No. 8, Aug. 2003, pp. 1912-1921.

Waldschmidt, Christian, et al., "Complete RF system model for analysis of compact MIMO arrays,", IEEE Trans. on Vehicular Technologies, vol. 53, (May 2004), 579-586.

Wallace, Jon W., et al., "Termination-dependent diversity performance of coupled antennas: Network theory analysis,", IEEE Trans. Antennas Propagat., vol. 52, (Jan. 2004), 98-105.

Warrington, E.M, et al. "Measurement and Modeling Of HF Channel Directional Spread Characteristics For Northerly Paths", Radio Science, vol. 41, RS2006, D0I:10.1029/2005R5003294, 2006, pp. 1-13.

Wheeler, Harold A., et al., "Small antennas", IEEE Trans. Antennas Propagat., vol. AP-23, n. 4, (Jul. 1975), 462-469.

Wikipedia, "Mobile ad hoc network", printed on Mar. 8, 2011, pp. 1-3, http://en.wikipedia.org/wiki/Mobile_ad_hoc_network.

Wikipedia, "List of ad hoc routing protocols", printed on Mar. 8, 2011, http://en.wikipedia.org/wiki/List.sub.—of.sub.—ad.sub.—hoc.sub.—routi- ng.sub.—protocols.

Wong, et al., "Performance Enhancement of Multiuser MIMO Wireless Communication Systems", IEEE Transactions On Communications, vol. 50, No. 12, Dec. 2002, pp. 1960-1970.

Wong, Kai-Kit, et al., "A joint-channel diagonalization for multiuser MIMO antenna systems", IEEE Trans. Wireless Comm., vol. 2, (Jul. 2003), 773-786.

Yoo, et al., "Multi-Antenna Downlink Channels with Limited Feedback and User Selection", IEEE Journal On Selected Areas In Communications, vol. 25, No. 7, Sep. 2007, pp. 1478-1491.

Yu, et al., "Sum Capacity of Gaussian Vector Broadcast Channels", IEEE Transactions On Information Theory, vol. 50, No. 9, Sep. 2004, pp. 1875-1892.

Zhang, et al., "Coordinated Multi-Cell MIMO Systems With Cellular Block Diagonalization", IEEE 2007, pp. 1669-1673.

Zhang, et al., "Networked MIMO with Clustered Linear Precoding", IEEE Transactions On Wireless Communications, vol. 8, No. 4, Apr. 2009, pp. 1910-1921.

Zheng, Lizhong, et al., "Diversity and multiplexing: a fundamental tradeoff in multiple antenna channels", IEEE Trans. Info. Th., vol. 49, No. 5, (May 2003), 1073-1096.

Zhuang, X, et al., "Channel models for link and system level simulations", IEEE 802.16 Broadband Wireless Access Working Group, (Sep. 2004).

Zogg, et al., "Multipath Delay Spread in a Hilly Region at 210 MHz", IEEE Transactions On Vehicular Technology, vol. VT-36, No. 4, Nov. 1987, pp. 184-187.

"Quantum Cryptography." Wikipedia: The Free Encyclopedia. Wikimedia Foundation, Inc. Jul. 26, 2014. Web. Nov. 14, 2014, 5 pages. <http://en.wikipedia.org/wiki/Quantum_cryptography>.

Brassard, Gilles, et al., "A Quantum Bit Commitment Scheme Provably Unbreakable by both Parties". IEEE, FOCS 1993, pp. 362-371.

Mayers, Dominic, "Unconditionally Secure Quantum Bit Commitment is Impossible". *Physical Review Letters* (APS) 78 (17), 1997, 5 pages.

Lunghi, T., et al., "Experimental Bit Commitment Based on Quantum Communication and Special Relativity", Phys. Rev. Lett. 111, 180504—Published Nov. 1, 2013, pp. 1-16.

Damgard, Ivan, et al., "Cryptography in the Bounded Quantum-Storage Model". IEEE, FOCS 2005, pp. 24-27.

Koenig, Robert, et al., "Unconditional security from noisy quantum storage". IEEE Transactions on Information Theory, vol. 58, No. 3, Mar. 2012, pp. 1962-1984.

Cachin, Christian, et al. "Oblivious Transfer with a Memory-Bounded Receiver". FOCS 1998. IEEE. pp. 493-502.

Dziembowski, Stefan, et al. "On Generating the Initial Key in the Bounded-Storage Model". Eurocrypt 2004. LNCS 3027. Springer. pp. 126-137.

Chandran, Nishanth, et al., "Position-Based Cryptography", Department of Computer Science, UCLA, 2009, 50 pages.

(56) References Cited

OTHER PUBLICATIONS

Kent, Adrian, et al, "Quantum Tagging: Authenticating Location via Quantum Information and Relativistic Signalling Constraints". 2010, 9 pages. Phys. Rev. A84, 012326 (2011), DOI: 10.1103/PhysRevA. 84.012326, arXiv:1008.2147.

Lau, Hoi-Kwan, et al., "Insecurity of position-based quantum-cryptography protocols against entanglement attacks". Physical Review A (APS), 2010, 83: 012322, 13 pages.

Malaney, Robert, A., et al., "Location-dependent communications using quantum entanglement". Physical Review A, 2010, 81: 042319, 11 pages.

Buhrman, Harry, et al., "Position-Based Quantum Cryptography: Impossibility and Constructions". 2010, 27 pages.

"Post-quantum cryptography". Web. Retrieved Nov. 14, 2014, 3 pages. //postcrypto.org/.

Bernstein, Daniel J., et al., "Post-quantum cryptography" Springer, 2009, 248 pages ISBN 978-9-540-88701-0.

Watrous, John, "Zero-Knowledge against Quantum Attacks". *SIAM J. Comput.* 39 (1): 25-58. (2009), pp. 1-21.

3GPP Technical Specification Group, "Spatial channel model, SCM-134 text V6.0," Spatial Channel Model AHG (Combined ad-hoc from 3GPP and 3GPP2), Apr. 2003, pp. 1-45.

3GPP TR 25.912, "Feasibility Study for Evolved UTRA and UTRAN", V9.0.0 (Oct. 2009), 66 pages.

3GPP TR 25.913, "Requirements for Evolved UTRA (E-UTRA) and Evolved UTRAN (E-UTRAN)", V8.0.0 (Jan. 2009), 20 pages.

W. C. Jakes, Microwave Mobile Communications, IEEE Press, 1974, 4 pages.

J. G. Proakis, Communication System Engineering, Prentice Hall, 1994, 11 pages.

M. R. Andrews, P. P. Mitra, and R. deCarvalho, "Tripling the capacity of wireless communications using electromagnetic polarization," Nature, vol. 409, pp. 316-318, Jan. 2001.

T. Yoo, N. Jindal, and A. Goldsmith, "Multi-antenna downlink channels with limited feedback and user selection," IEEE Journal on Sel. Areas in Communications, vol. 25, pp. 1478-1491, Jul. 2007.

Wi-Fi alliance, homepage, pp. 1-3, [printed on Nov. 17, 2014], www.wi-fi.org.

Wi-Fi alliance, "Wi-Fi certified makes it Wi-Fi", What Retailers Need to Know, 2009, pp. 1-8, www.wi-fi.org/file/wi-fi-ceritified-makes-it-wi-fi-what-retailers-need-to-know.

3GPP, "UMTS", Universal Mobile Telecommunications System, pp. 1-2, printed on Nov. 17, 2014, www.3gpp.org/article/umts.

Motorola, "Long Term Evolution (LTE): A Technical Overview", pp. 1-15, 2007, http://business.motorola.com/experiencelte/pdf/LTETechnicalOverview.pdf.

Federal Communications Commission, "Authorization of Spread Spectrum Systems Under Parts 15 and 90 of the FCC Rules and Regulations", Jun. 1985, 2 pages [printed on Nov. 18, 2014].

Blelloch, "Introduction to Data Compression", Carnegie Mellon University Tech. Report Sep. 2010, pp. 1-55.

Office Action from U.S. Appl. No. 12/802,989, mailed Nov. 25, 2014, 17 pages.

\* cited by examiner

SYSTEMS AND METHODS FOR WIRELESS BACKHAUL IN DISTRIBUTED-INPUT DISTRIBUTED-OUTPUT WIRELESS SYSTEMS

RELATED APPLICATIONS

This application is a continuation-in-part of the following co-pending U.S. patent applications:

U.S. application Ser. No. 13/475,598, entitled "System and Methods To Enhance Spatial Diversity In Distributed-Input Distributed-Output Wireless Systems."

U.S. application Ser. No. 13/464,648, entitled "System and Methods to Compensate for Doppler Effects in Distributed-Input Distributed Output Systems."

U.S. application Ser. No. 12/917,257, entitled "Systems And Methods To Coordinate Transmissions In Distributed Wireless Systems Via User Clustering"

U.S. application Ser. No. 12/802,988, entitled "Interference Management, Handoff, Power Control And Link Adaptation In Distributed-Input Distributed-Output (DIDO) Communication Systems"

U.S. Pat. No. 8,170,081, issued May 1, 2012, entitled "System And Method For Adjusting DIDO Interference Cancellation Based On Signal Strength Measurements"

U.S. application Ser. No. 12/802,974, entitled "System And Method For Managing Inter-Cluster Handoff Of Clients Which Traverse Multiple DIDO Clusters"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,958, entitled "System And Method For Power Control And Antenna Grouping In A Distributed-Input-Distributed-Output (DIDO) Network"

U.S. application Ser. No. 12/802,975, entitled "System And Method For Link adaptation In DIDO Multicarrier Systems"

U.S. application Ser. No. 12/802,938, entitled "System And Method For DIDO Precoding Interpolation In Multicarrier Systems"

U.S. application Ser. No. 12/630,627, entitled "System and Method For Distributed Antenna Wireless Communications"

U.S. Pat. No. 7,599,420, issued Oct. 6, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,636,381, issued Dec. 22, 2009, entitled "System and Method for Distributed Input Distributed Output Wireless Communication";

U.S. Pat. No. 8,160,121, issued Apr. 17, 2012, entitled, "System and Method For Distributed Input-Distributed Output Wireless Communications";

U.S. Pat. No. 7,711,030, issued May 4, 2010, entitled "System and Method For Spatial-Multiplexed Tropospheric Scatter Communications";

U.S. Pat. No. 7,418,053, issued Aug. 26, 2008, entitled "System and Method for Distributed Input Distributed Output Wireless Communication";

U.S. Pat. No. 7,885,354, issued Aug. 2, 2011, entitled "System and Method For Enhancing Near Vertical Incidence Skywave ("NVIS") Communication Using Space-Time Coding."

BACKGROUND

Prior art multi-user wireless systems add complexity and introduce limitations to wireless networks which result in a situation where a given user's experience (e.g. available bandwidth, latency, predictability, reliability) is impacted by the utilization of the spectrum by other users in the area. Given the increasing demands for aggregate bandwidth within wireless spectrum shared by multiple users, and the increasing growth of applications that can rely upon multi-user wireless network reliability, predictability and low latency for a given user, it is apparent that prior art multi-user wireless technology suffers from many limitations. Indeed, with the limited availability of spectrum suitable for particular types of wireless communications (e.g. at wavelengths that are efficient in penetrating building walls), prior art wireless techniques will be insufficient to meet the increasing demands for bandwidth that is reliable, predictable and low-latency.

BRIEF DESCRIPTION OF THE DRAWINGS

The patent or application file contains at least one drawing executed in color. Copies of this patent or patent publication with color drawing(s) will be provided by the U.S. Patent and Trademark Office upon request and payment of the necessary fee.

A better understanding of the present invention can be obtained from the following detailed description in conjunction with the drawings, in which.

DETAILED DESCRIPTION

Figure 1:
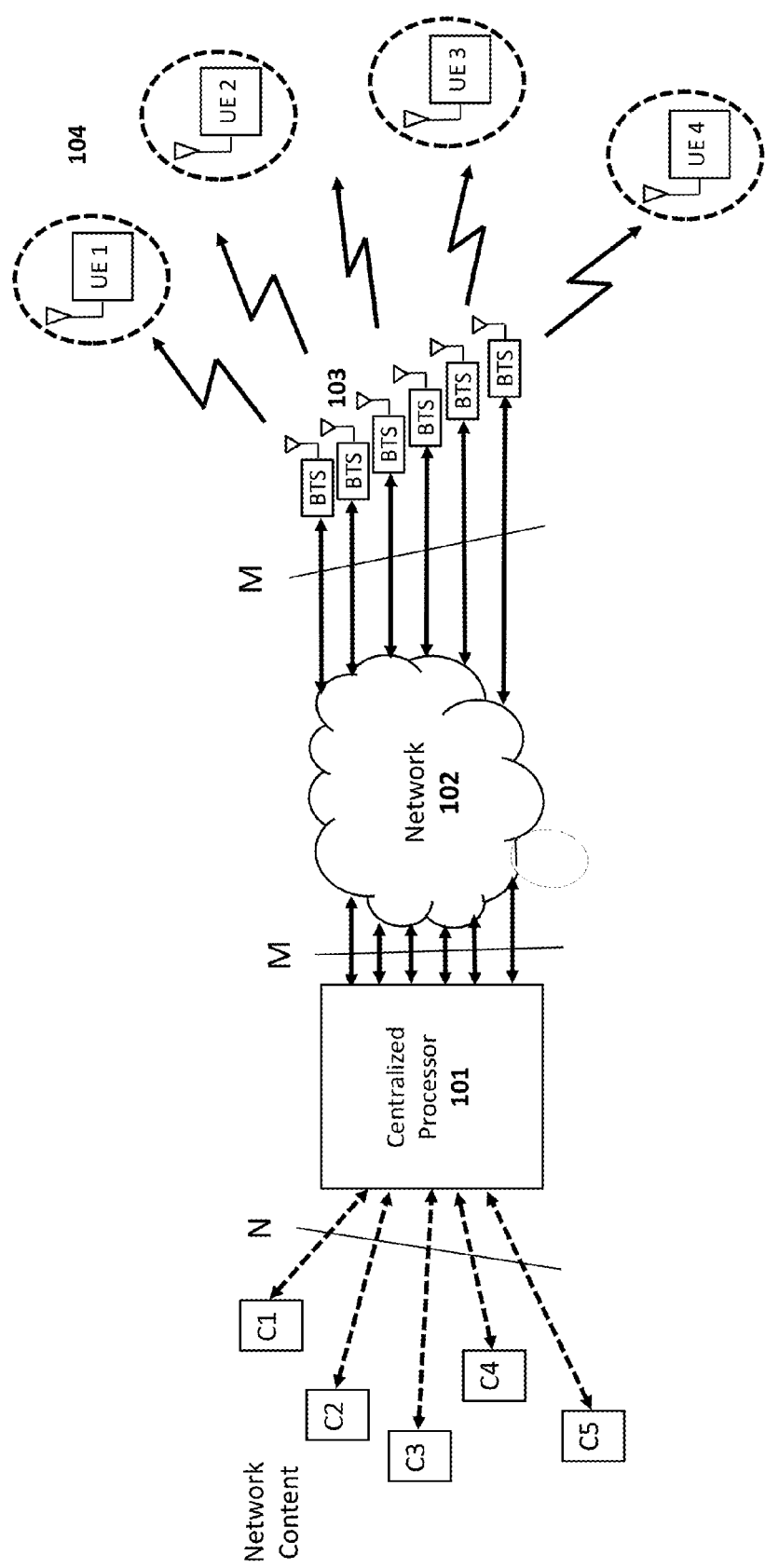
FIG. 1 illustrates one embodiment of the MU-MAS consists of a centralized processor 101, a network 102 and M transceiver stations 103 communicating wirelessly to N client devices UE1-UE4.

One solution to overcome many of the above prior art limitations is an embodiment of Distributed-Input Distributed-Output (DIDO) technology. DIDO technology is described in the following patents and patent applications, all of which are assigned the assignee of the present patent and are incorporated by reference. These patents and applications are sometimes referred to collectively herein as the "related patents and applications."

U.S. application Ser. No. 13/475,598, entitled "Systems and Methods to Enhance Spatial Diversity in Distributed Input Distributed Output Wireless Systems."

U.S. application Ser. No. 13/464,648, entitled "System and Methods to Compensate for Doppler Effects in Distributed-Input Distributed Output Systems."

U.S. application Ser. No. 12/917,257, entitled "Systems And Methods To Coordinate Transmissions In Distributed Wireless Systems Via User Clustering"

U.S. application Ser. No. 12/802,988, entitled "Interference Management, Handoff, Power Control And Link Adaptation In Distributed-Input Distributed-Output (DIDO) Communication Systems"

U.S. Pat. No. 8,170,081, issued May 1, 2012, entitled "System And Method For Adjusting DIDO Interference Cancellation Based On Signal Strength Measurements"

U.S. application Ser. No. 12/802,974, entitled "System And Method For Managing Inter-Cluster Handoff Of Clients Which Traverse Multiple DIDO Clusters"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,958, entitled "System And Method For Power Control And Antenna Grouping In A Distributed-Input-Distributed-Output (DIDO) Network"

U.S. application Ser. No. 12/802,975, entitled "System And Method For Link adaptation In DIDO Multicarrier Systems"

U.S. application Ser. No. 12/802,938, entitled "System And Method For DIDO Precoding Interpolation In Multicarrier Systems"

U.S. application Ser. No. 12/630,627, entitled "System and Method For Distributed Antenna Wireless Communications"

U.S. Pat. No. 7,599,420, issued Oct. 6, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,636,381, issued Dec. 22, 2009, entitled "System and Method for Distributed Input Distributed Output Wireless Communication";

U.S. Pat. No. 8,160,121, issued Apr. 17, 2012, entitled, "System and Method For Distributed Input-Distributed Output Wireless Communications";

U.S. application Ser. No. 11/256,478, entitled "System and Method For Spatial-Multiplexed Tropospheric Scatter Communications";

U.S. Pat. No. 7,418,053, issued Aug. 26, 2008, entitled "System and Method for Distributed Input Distributed Output Wireless Communication";

U.S. application Ser. No. 10/817,731, entitled "System and Method For Enhancing Near Vertical Incidence Skywave ("NVIS") Communication Using Space-Time Coding."

To reduce the size and complexity of the present patent application, the disclosure of some of the related patents and applications is not explicitly set forth below. Please see the related patents and applications for a full description of the disclosure.

1. SYSTEM DESCRIPTION

We describe a multiuser (MU) multiple antenna system (MAS) for wireless transmissions comprising wireless and/or wireline backhaul to connect multiple antennas. The MU-MAS consists of a centralized processor 101, a network 102 and M transceiver stations 103 communicating wirelessly to N client devices UE1-UE4, as depicted in FIG. 1.

The centralized processor unit 101 receives N streams of information with different network contents (e.g., videos, web-pages, video games, text, voice, etc., streamed from Web servers or other network sources C1-C5) intended for different client devices. Hereafter, we use the term "stream of information" to refer to any stream of data sent over the network containing information that can be demodulated or decoded as a standalone stream, according to certain modulation/coding scheme or protocol, to produce certain voice, data or video content. In one embodiment, the stream of information is a sequence of bits carrying network content that can be demodulated or decoded as a standalone stream.

The centralized processor 101 utilizes precoding transformation to combine (according to certain algorithm) the N streams of information from the network content C1-C5 into M streams of bits. The precoding transformation can be linear (e.g., zero-forcing [22], block-diagonalization [20-21], matrix inversion, etc.) or non-linear (e.g., dirty-paper coding [11-13] or Tomlinson-Harashima precoding [14-15], lattice techniques or trellis precoding [16-17], vector perturbation techniques [18-19]). Hereafter, we use the term "stream of bits" to refer to any sequence of bits that does not necessarily contain any useful bit of information and as such cannot be demodulated or decoded as a standalone stream to retrieve the network content. In one embodiment of the invention, the stream of bits is the complex baseband signal produced by the centralized processor and quantized over given number of bits to be sent to one of the M transceiver stations 103.

In one embodiment, the MAS is a distributed-input distributed-output (DIDO) system as described in our previous patent applications [0002-0018]. In this embodiment, the DIDO system consists of:

User Equipment (UE) 104: An RF transceiver for fixed or mobile clients 104 receiving data streams over the downlink (DL) channel from the DIDO backhaul and transmitting data to the DIDO backhaul via the uplink (UL) channel Base Transceiver Station (BTS) 103: The BTSs 103 interface the DIDO backhaul with the wireless channel. BTSs of one embodiment are access points 103 consisting of DAC/ADC and radio frequency (RF) chain to convert the baseband signal to RF. In some cases, the BTS is a simple RF transceiver equipped with power amplifier/antenna and the RF signal is carried to the BTS via RF-over-fiber technology as described in our previous patent applications.

Controller (CTR): A CTR is one particular type of BTS 103 designed for certain specialized features such as transmitting training signals for time/frequency synchronization of the BTSs and/or the UEs, receiving/transmitting control information from/to the UEs, receiving the channel state information (CSI) or channel quality information from the UEs. One or multiple CTR stations can be included in any DIDO system. When multiple CTRs are available, the information to or from those stations are combined to increase diversity and improve link quality. In one embodiment, the CSI is received from multiple CTRs via maximum ratio combining (MRC) techniques to improve CSI demodulation. In another embodiment, the control information is sent from multiple CTRs via maximum ratio transmission (MRT) to improve SNR at the receiver side. The scope of the invention is not limited to MRC or MRT, and any other diversity technique (such as antenna selection, etc.) can be employed to improve wireless links between CTRs and UEs.

Centralized Processor (CP): The CP is a DIDO server 101 interfacing the Internet or other types of external networks with the DIDO backhaul. In one embodiment, the CP computes the DIDO baseband processing and sends the waveforms to the distributed BTSs for DL transmission Base Station Network (BSN): The BSN is the network 102 connecting the CP 101 to the distributed BTSs 103 carrying information for either the DL or the UL channel. The BSN is a wireline or a wireless network or a combination of the two. For example, the BSN is a DSL, cable, optical fiber network, or line-of-sight or non-line-of-sight wireless link. Furthermore, the BSN is a proprietary network, or a local area network, or the Internet.

2. WIRELESS AND WIRELINE BACKHAUL

Figure 2:
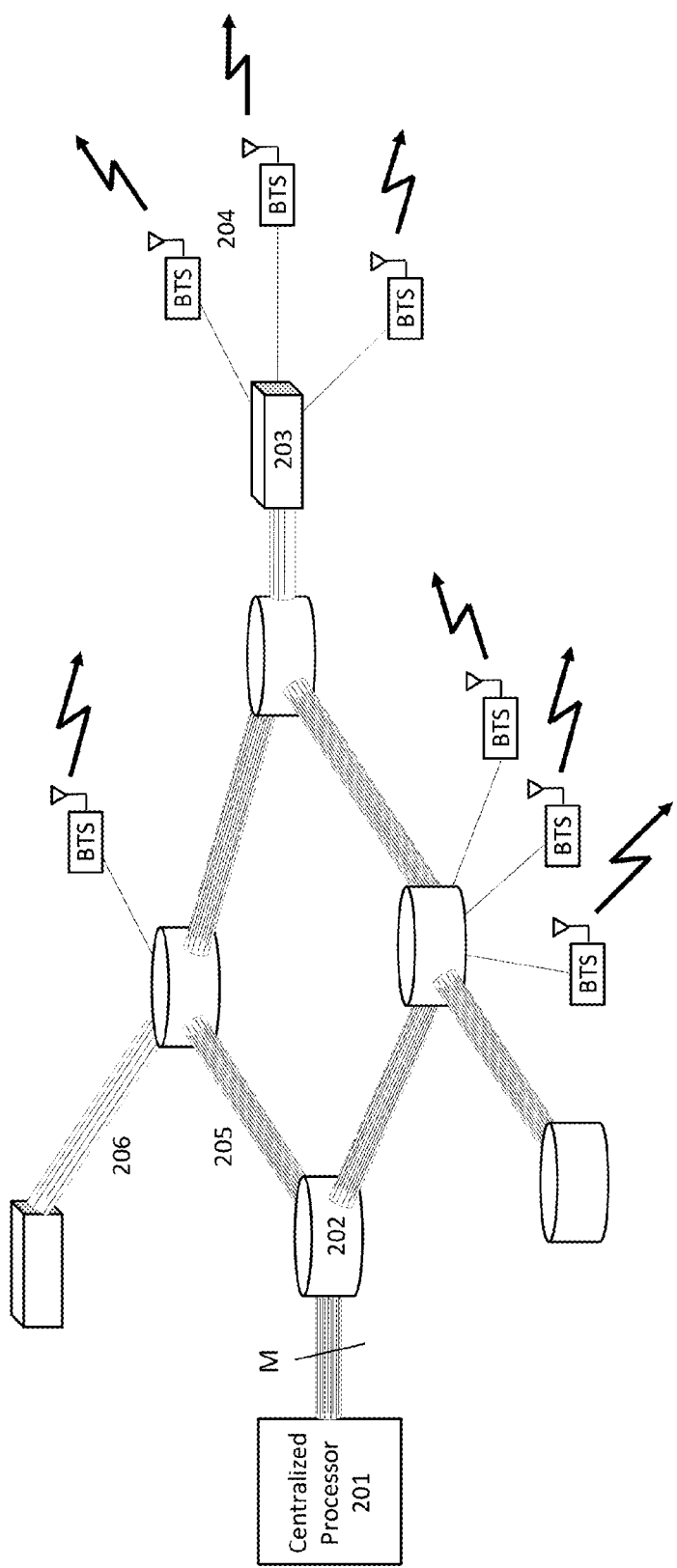
FIG. 2 illustrates one embodiment consisting of multiple routers or gateways 202 and high-speed wired links 205 that interconnect the centralized processor 201 to 202 as well as routers or gateways 202 among themselves.

The embodiments of the present invention describe systems and methods for practical BSN deployment via wireless or wireline links (or combination of both) in DIDO systems. In one embodiment, the BSN is the wireline network in FIG. 2 consisting of multiple routers or gateways 202 and high-speed wired links 205 that interconnect the centralized processor 201 to 202 as well as routers or gateways 202 among themselves. The wired links 205 carry the streams of bits to be sent to all the BTSs 204 connected to the same DIDO BSN. Routers and gateways are connected to switches or hubs 203 via wired links 206. The wired links 206 carry only the streams of bits intended to the BTSs 204 connected to the same switch or hub 203. The BTSs 204 send the streams of bits received from the centralized processor 201 simultaneously over the DIDO wireless link in a way that every UE recovers and demodulates its own stream of information.

The wired links 205 and 206 are comprised of various network technologies including, but not limited to, digital subscriber lines (DSL), cable modems, fiber rings, T1 lines, hybrid fiber coaxial (HFC) networks. Dedicated fiber typically has very large bandwidth and low latency, potentially less than a millisecond in a local region, but it is less widely deployed than DSL and cable modems. Today, DSL and cable modem connections typically have between 10-25 ms in last-mile latency in the United States, but they are very widely deployed.

The streams of bits sent over the BSN consist of baseband signals from the CP to the BTSs. Assuming each complex sample of the baseband signal is quantized over 32 bits (i.e., 16 for real and 16 for imaginary parts) the total bandwidth requirement for the BSN to operate the BTSs at 10 MSample/sec (i.e., a 10 MHz bandwidth) over the wireless DIDO links is 320 Mbps. Typically, only 16 or fewer bits of quantization are enough to represent the baseband signal with negligible error (especially if compression techniques are utilized to reduce the bandwidth requirements), thereby reducing the BSN throughput requirement to 160 Mbps or less. In one embodiment of the invention, the DIDO systems use compression techniques to reduce the amount of throughput required over the BSN backhaul. Moreover, DIDO technology has been proven to provide an order of magnitude increase in spectral efficiency over any existing wireless technology. Therefore, it is possible to relax the baseband throughput requirement at the BTS from 10 MSample/sec down to 5 Sample/sec or 1 Sample/sec, while providing comparable or higher per-user throughput over the wireless link than any conventional wireless communications systems. Hence, in practical DIDO deployments, the throughput requirement at the BSN can be as low as 16 Mbps to every BTS.

Figure 3:
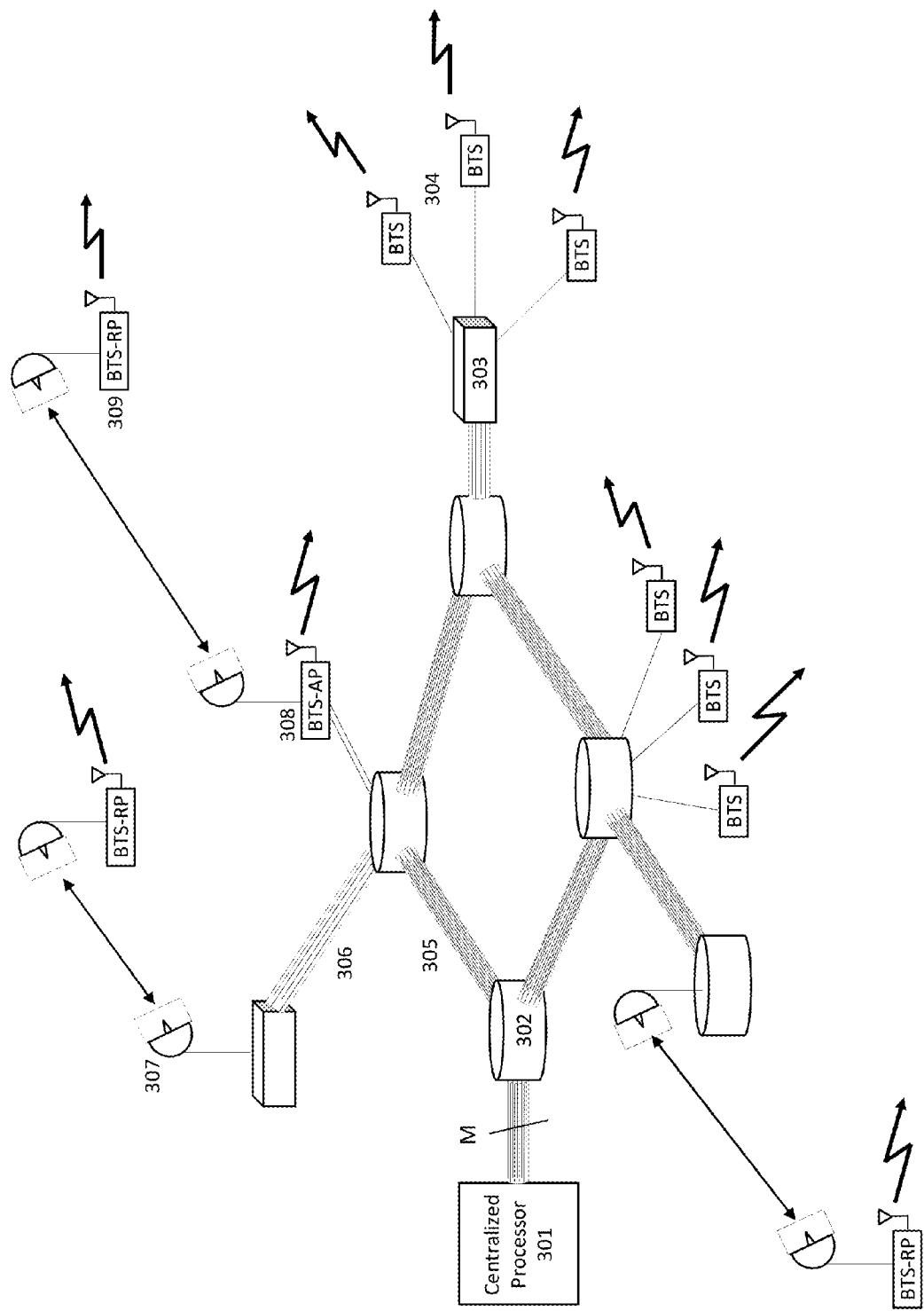
FIG. 3 illustrates one embodiment of the BTS-AP 408 retransmits the streams of bits to multiple BTS-RPs 409 and 410 over point-to-multipoint wireless links.

In another embodiment, c. When a wireless link is used between two BTSs, one BTS acts as an access point (BTS-AP) 308 that redistributes wirelessly the streams of bits to other remote BTSs. Every remote BTS receives its dedicated stream of bits from the BTS-AP and retransmits over the DIDO wireless link, acting as a repeater (BTS-RP) 309. Note that the zigzagged single-arrowed lines in FIG. 3 indicate wireless transmission streams of bits from the BTSs to the UEs over the DIDO links, whereas the straight double-arrowed lines indicate point-to-point wireless transmission over the BSN backhaul.

Some examples of wireless links used for the BSN backhaul are commercially available WiFi bridges operating in the ISM 2.4, 5.8 or 24 GHz bands [1-5], or wireless optics communications such as laser light transmission [6], or any other radio frequency (RF) or optics proprietary system that can provide high-throughput low-latency wireless network connections. Note that all of the above systems can achieve reliable connection speeds from 100 Mbps up to 1 Gbps or more, which is sufficient to enable high-speed wireless links between BTS-AP and BTS-RPs over the BSN.

Figure 4:
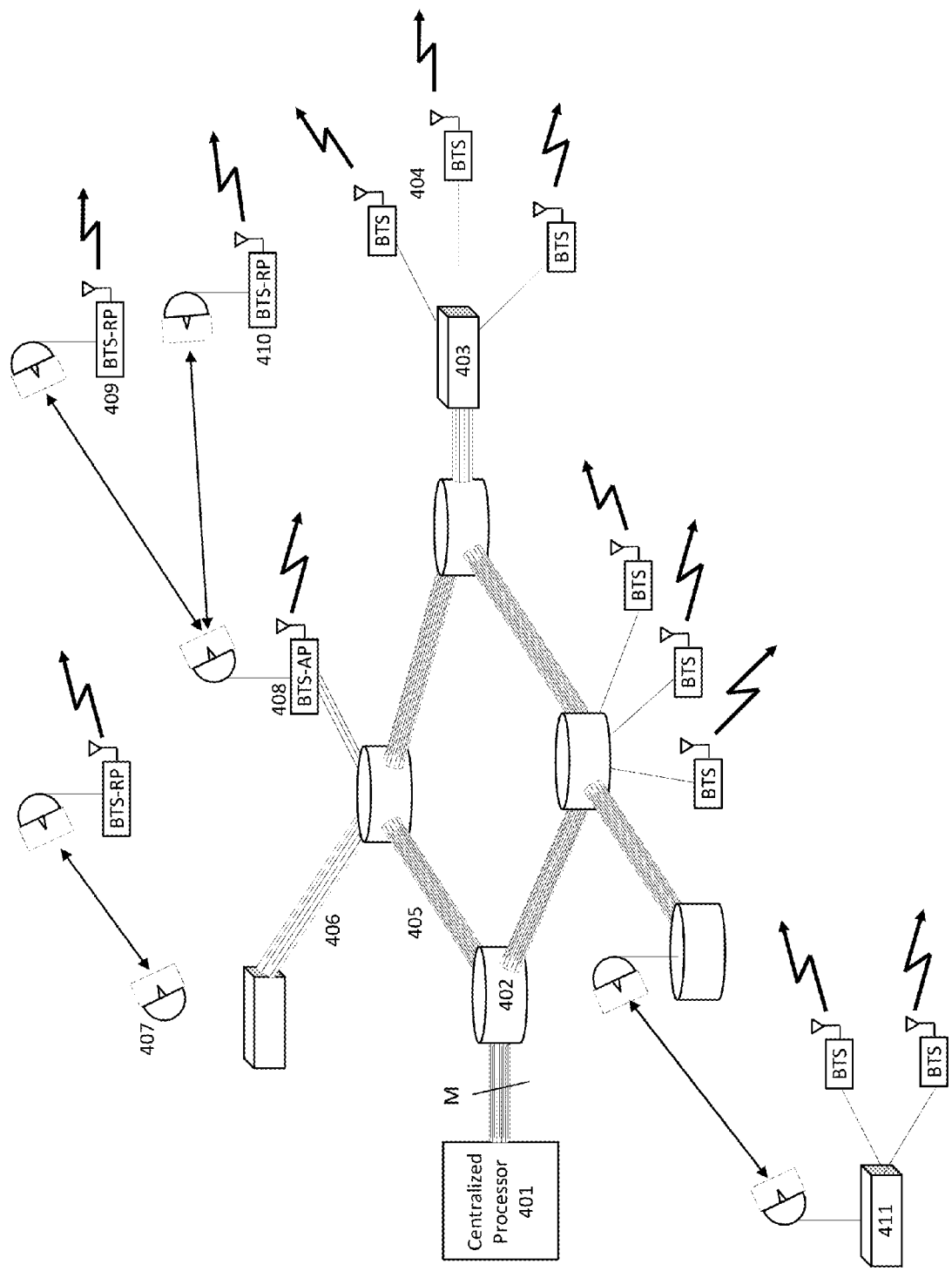
FIG. 4 illustrates one embodiment of the BTS-AP 408 retransmits the streams of bits to multiple BTS-RPs 409 and 410 over point-to-multipoint wireless links.

In another embodiment, the BTS-AP 408 retransmits the streams of bits to multiple BTS-RPs 409 and 410 over point-to-multipoint wireless links, as shown in FIG. 4. The BTS-AP employs the same wireless resource (i.e., same time and same frequency band) for all links to the BTS-RPs, and avoids interference between links by creating very narrow beams (via highly directional antennas or antenna arrays using beamforming techniques). Narrow beams can also be used at the BTS-RPs to improve link quality and reduce interference from other neighbor locations. When remote locations are too close to each other and it is impractical to direct narrow beams to them without them interfering, the same wireless resource can be shared between those BTS-RPs via different multiple access techniques such as TDMA, FDMA, OFDMA or CDMA.

To provide network service from the BTS-AP to the BTS-RPs, the present invention employs point-to-point or point-to-multipoint line-of-sight (LOS) links. In another embodiment, the LOS may not be available and the link employs beamforming, MRT, MIMO or other diversity techniques to improve link quality in non-LOS (NLOS) links.

Figure 5:
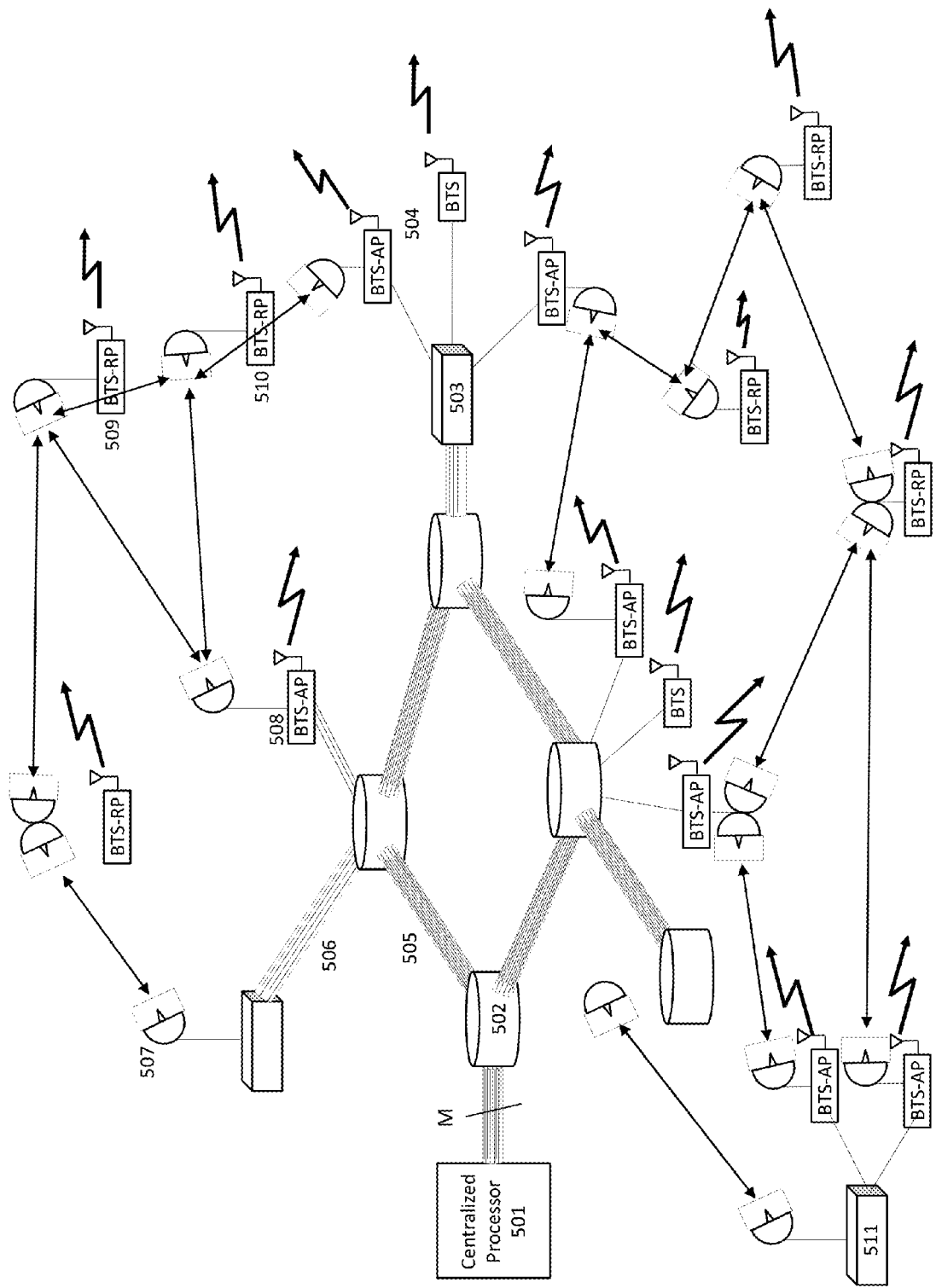
FIG. 5 illustrates one embodiment of a DIDO system utilized the mesh network [5, 7-8]

Another way to extend coverage area of the wireless backhaul is via mesh networks [5, 7-9]. A practical mesh network in downtown San Francisco, Calif. has been deployed by Webpass [8] using Wi-Fi transceivers operating in the ISM band that can achieve speeds from 45 Mbps up to 200 Mbps. As described above, these speeds would be sufficient for carrying the streams of bits from the CP to the BTSs in a practical BSN deployment. In one embodiment of the invention, a DIDO system utilized the mesh network [5, 7-8] in FIG. 5 to extend coverage to multiple BTSs distributed across a wide area. Every loop of the mesh network comprises of one or multiple BTS-APs to guarantee continuous connection to other BTS-RPs, even in the occurrence of temporary or permanent network failures.

Figure 6:
FIG. 6 illustrates one example of BSN deployment in downtown San Francisco, Calif.

One example of BSN deployment in downtown San Francisco, Calif., is depicted in FIG. 6. The circles indicate locations that have access to fiber or other types of high-speed wireline network connections. Some of those locations may be equipped with BTS-APs, or routers and switches using antennas 307 for point-to-point wireless transmission of the streams of bits to other BTSs. The solid dots denote BTS-RPs 309, or routers and switches employing antennas 307 to receive the streams of bits and retransmit them over the DIDO wireless links. Note that the BTS-AP can also retransmit its own stream of bits wirelessly over the DIDO link, thereby acting as a repeater too.

In one embodiment of the invention, one or more of the highest BTS-APs in the BSN broadcast control information to all other DIDO BTSs. Control information consists of training sequences or known pilots at given frequency used to recover time and frequency offsets at the BTSs. For example, the main BTS-AP sends one training sequence known by all other BTSs, such that those BTSs can estimate time and frequency offsets, and use them for time and frequency synchronization. In this scenario, the BTSs do not need any global positioning system (GPS) receiver to keep time and frequency synchronization among each other.

We observe that, though the layout in FIG. 6 looks similar to typical cellular systems (i.e., with one main tower sending wireless signal to multiple locations), its framework and functionalities are fundamentally different. In fact, the BTS-AP sends streams of bits to the BTS-RPs as opposed to streams of information in cellular systems. Streams of bits are sent over the BSN backhaul in our invention, whereas the streams of information are sent from the tower to the subscribers (i.e., last part of the communications link, following the backhaul) in a cellular system. Also, the links from the BTS-AP to every BTS-RP are fixed point-to-point, meaning they use high directional antennas such that interference to other BTS-RPs is removed and the link quality is improved. On the other hand, cellular systems transmit energy over the entire cell or sector or part of sector (via beamforming) and avoids interference across clients by using different multiple access techniques (e.g., TDMA, FDMA, OFDMA, CDMA, SDMA).

Figure 7:
FIG. 7 illustrates one embodiment shows two stations downtown San Francisco with point-to-multipoint links. Note that any BTS-RP can repeat the signal to other BTS-NPs as well as shown on the left side of that figure.

When only one BTS-AP is insufficient to serve multiple BTS-RPs spread across a wide area, additional BTS-APs can be used to establish other point-to-point/multipoint links to the BTS-RPs. For example, FIG. 7 shows two stations downtown San Francisco with point-to-multipoint links. Note that any BTS-RP can repeat the signal to other BTS-NPs as well as shown on the left side of that figure.

Figure 8:
FIG. 8 illustrates an exemplary mesh network deployment with nodes distributed around downtown San Francisco.

FIG. 8 depicts an exemplary mesh network deployment with nodes distributed around downtown San Francisco. A few key advantages of the mesh type of architecture are:

Serendipitous Deployment: The BTSs can be placed anywhere it is convenient. For the BTS-AP the only requirements are connection to power source and to high-speed wired network. The BTS-RP has no need for network connection, since that can be established wirelessly, and it can be placed anywhere there is roof access available. In contrast, in prior art wireless systems, such as cellular, BTSs are restricted in their physical placement relative to one another and physical obstacles, often resulting in expensive, inconvenient or unsightly placement, or if a required placement is not available resulting in loss of coverage.

Better Coverage: Since the BTSs can be installed in a serendipitous fashion, it is realistic to assume that from almost any location around the service area it is possible to find at least one BTS connected to the mesh network. Hence, when installing a new BTS-RP there is good chances to find other BTS-RPs or BTS-APs in that neighborhood to access the mesh network. Likewise, any UE at a give location can see at least one or more BTSs to deliver its stream of information.

Lower Power Consumption: Every BTS does not need to transmit the streams of bits wirelessly to BTSs placed faraway. In fact, in a mesh network, the BTS reaches only one or a few BTSs in its neighborhood, thereby reducing transmit power requirement and yielding significant improvement in power consumption.

Higher Robustness to Network Failures: In a mesh network, one or multiple BTS-APs are connected to the same loop such that the network connection is always in place even in extreme situations when one or more BTS-APs shut down due to network failures or temporary power blackouts.

In one embodiment of the invention, the BSN is a serendipitous network where its nodes (e.g., BTS, BTS-AP or BTS-RP) are installed wherever it is convenient. The convenience of installation of the BTSs in the network is evaluated based on:

availability of high-speed low-latency network or Internet connection, whether wire, wireless, fiber or other connectivity;

whether it is feasible to obtain authorization to install BTSs in certain special locations (e.g., rooftops, power poles, light poles, monuments) or there is any restriction imposed by FCC emission limits;

how inexpensive it is to lease locations designated for installation of the BTSs. One of the economical advantages of DIDO over cellular systems is obtained by keeping CAPEX as well as OPEX of network deployment to a minimum. This is achieved by installing a multitude of extremely inexpensive BTSs, whose overall CAPEX and OPEX are much lower than cellphone towers required to cover the same service area.

Some embodiments discussed herein and in the related patents and applications require: i) access to a wireline network connection; ii) a power outlet. Removing these two requirements can significantly simplify the installation and maintenance of BTSs making the DIDO network more serendipitous. As discussed above, it is possible to remove the first requirement by utilizing BTS-AP and BTS-RP to create point-to-point/multipoint wireless links. To eliminate the second requirement, embodiments of the invention provide two solutions: i) exploiting solar power; ii) employing wireless power transfer.

Figure 9:
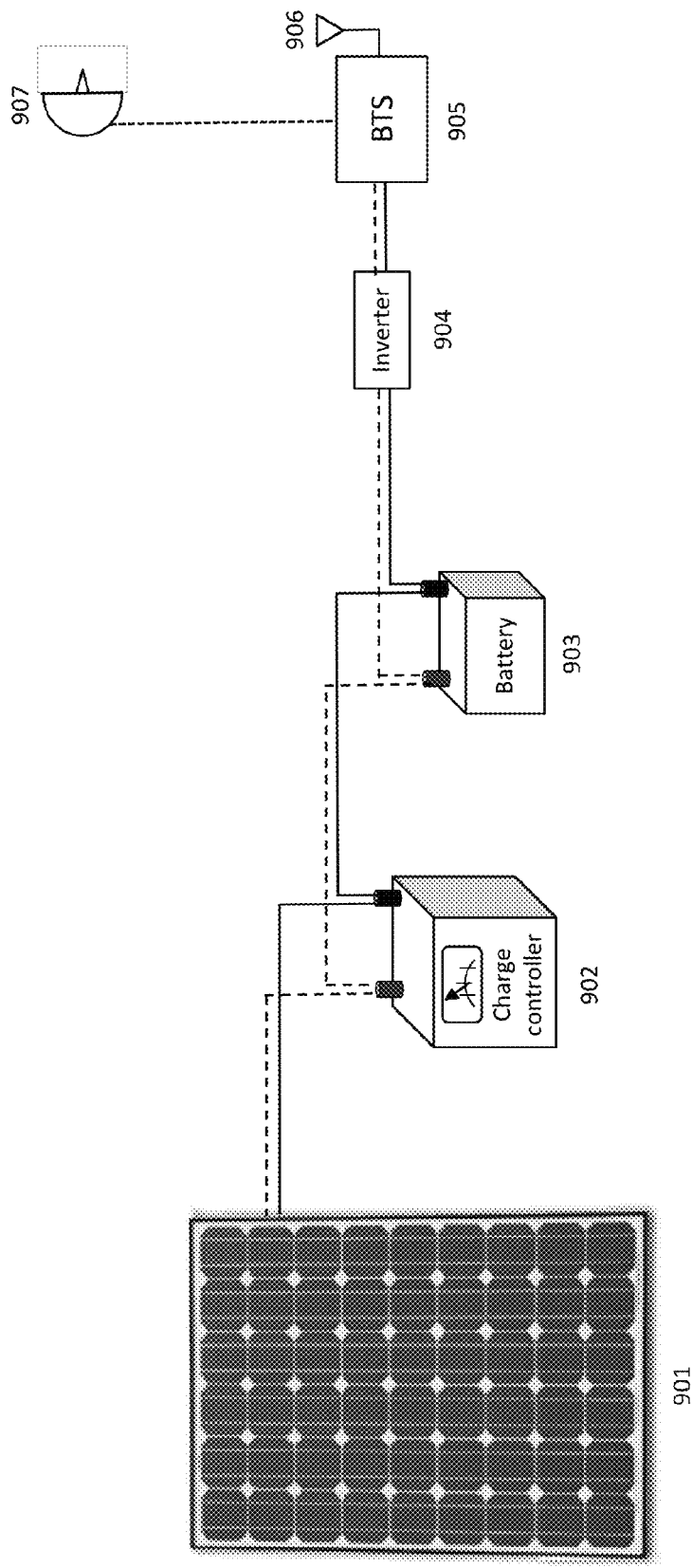
FIG. 9 illustrates one embodiment of solar panels 901 are connected to the charge controller 902 (the image of a meter is for illustration purposes only, and not a requirement for a charge controller) that charges the battery.

In one embodiment of the invention, solar panels 901 are connected to the charge controller 902 (the image of a meter is for illustration purposes only, and not a requirement for a charge controller) that charges the battery 903, as shown in FIG. 9. The battery provides DC current to the BTS 905 via the inverter 904, that converts the battery voltage to the voltage defined by the specs of the BTS. For example, if the BTS accepts input voltage of 6V and the battery provides 12V, the inverter converts 12V into 6V. The BTS is equipped with the antenna 906 to transmit and receive radio waves to/from the UEs via the wireless DIDO link. Moreover, the BTS is connected to another antenna 907 that provides network connectivity via the point-to-point/multipoint wireless link. Note that the antennas 906 and 907 can be tuned at the same frequency or different frequencies, depending on the part of the spectrum used for the two different types of links. For example, the DIDO link to antenna 906 can be designed to operate at VHF or UHF, whereas the point-to-point/multi-point link to antenna 907 may use the ISM band at microwaves (i.e., 5.8 GHz for WiFi). In one embodiment of the present invention, those links are not limited to any particular frequency of operation.

As an example, let us assume the BTS draws 3 Amps (A) of current at 6VDC input voltage to transmit 1 W over the wireless link, with less that 10% efficiency (i.e., accounting for power loss in the circuitry and use of class A linear power amplifiers, which are typically very inefficient). If the battery is rated for 60 Ah, the presently preferred embodiment would discharge it only down to 50% (or 30 Ah) to preserve its lifespan. Then, it would take approximately 10 hours to discharge the battery down to 50%, when the BTS is continuously powered on and operating at 1 W of radiated power. Typical commercially available solar panels operate with efficiency of about 20% to produce about 12 W/ft$^2$. Assuming there is enough real estate to host a 5 ft$^2$ solar panel, the total power produced by the solar panel 901 is 60 W. Since the battery voltage is typically 12VDC, the solar panel 901 provides 5 A of current to the battery through the charge controller. Hence it would take approximately 6 hours to recharge the battery from 50% to a 100% full charge with that solar panel. This is a typical example of a self-sustained system, where the charging rate is faster than the discharging rate. Note that a short charging rate and long discharging rate is particularly convenient for night operation, when the solar panel is inactive due to the lack of sunlight. In another embodiment, multiple batteries and a switch are used to switch across different batteries, allowing independent charging/discharging cycles throughout the day and maintaining consistent power supply during the night hours.

Figure 10:
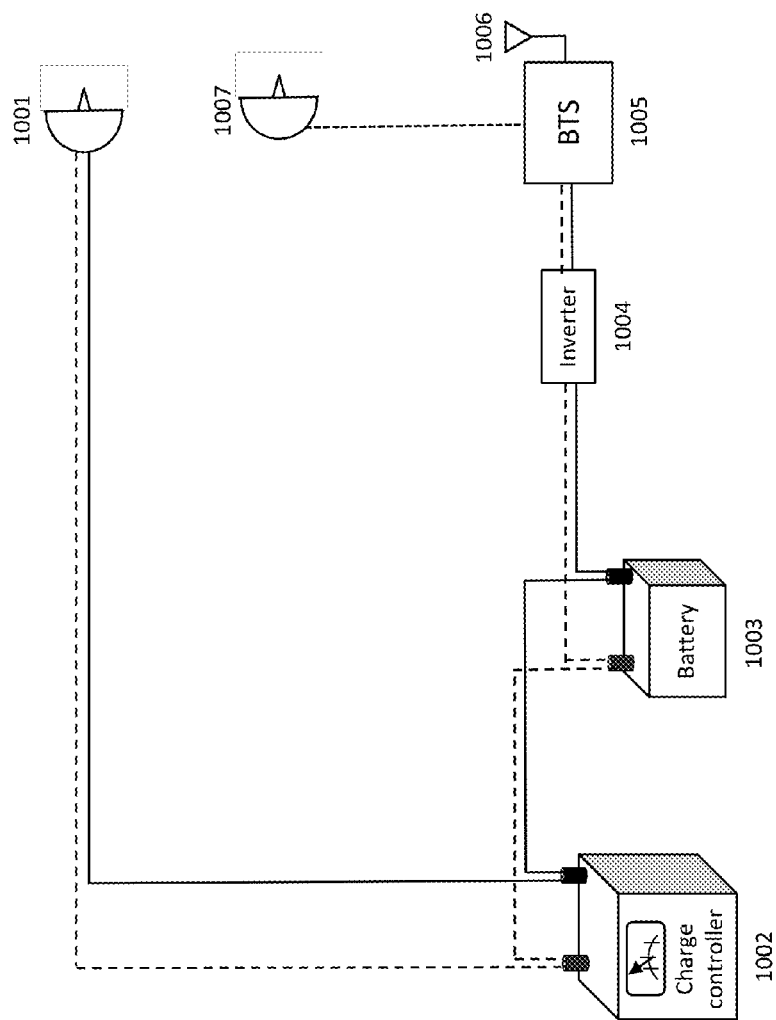
FIG. 10 illustrates one embodiment of the invention utilizes the rectenna.

In regions characterized by poor exposure to sunlight (e.g., rainy and cloudy places or locations close to the North and South Poles during the months of short daylight duration, shaded areas, etc.) solar panels may not be a practical solution to power up the BTS. One alternative is wireless power transfer. Another embodiment of the invention utilizes the rectenna 1001 in FIG. 10 to provide DC current to the battery 1003 through the charge controller 1002. The wireless power is transmitted to the rectenna 1001 via a highly directional antenna at a different location. In one embodiment, the wireless power transmitter is one or more BTS-APs with highly directional antennas to form a very narrow beam aimed to the location of the rectenna 1001. The rectenna 1001 itself is equipped with a highly directional antenna to increase the amount of received power.

Figure 11:
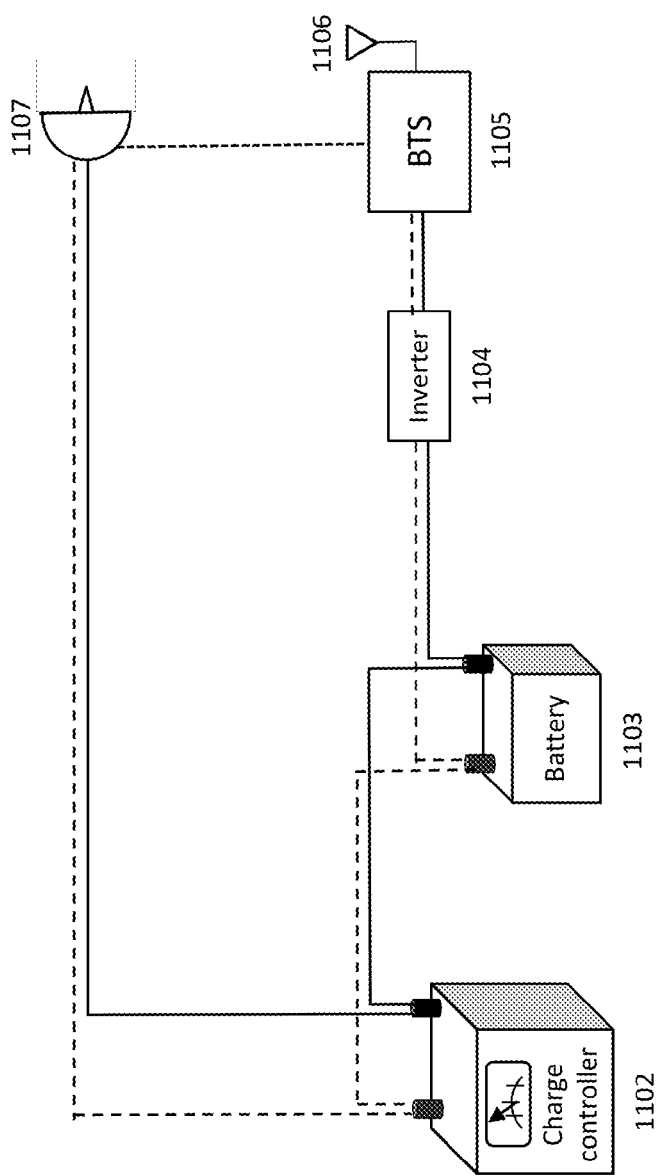
FIG. 11 illustrates one embodiment of the rectenna 1001 is combined with the antenna 1007 used for the point-to-point/multipoint wireless link to form the receiver.

In another embodiment, the rectenna 1001 is combined with the antenna 1007 used for the point-to-point/multipoint wireless link to form the receiver 1107 shown in FIG. 11. This is a compact design where the same antenna 1107 is used to demodulate digital content coming from the wireless network as well as storing power to feed the battery and so the BTS.

3. RECONFIGURABLE BTS CONFIGURATION

We have described systems and methods for wireless backhaul to provide network connection to all BTSs within the same BSN. Next, we describe systems and methods to reconfigure the network topology based on the UE distribution. In a recent report by Morgan Stanley [10] it was shown that traffic distribution in current cellular systems is highly heterogeneous: in typical cellular networks, only 20% of the base stations carry the 80% of the data traffic. This effect is due to high concentration of wireless subscribers in densely populated metro areas. In these areas, data congestion occurs when multiple subscribers try to access the cellular network at the same time during the busy hours of the day, resulting in dropped calls, limited connection speed and poor coverage.

Figure 12:
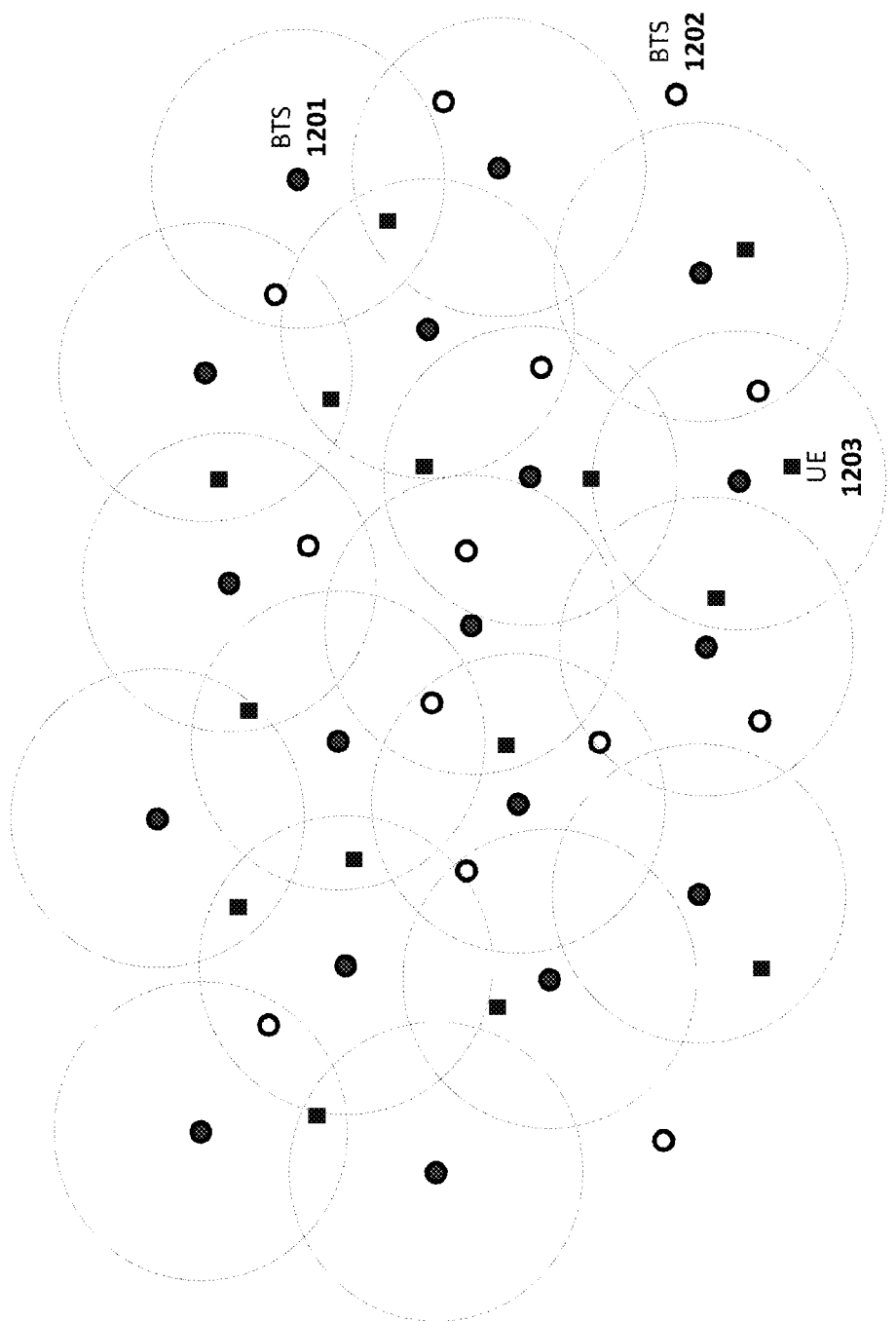
FIG. 12 illustrates one embodiment of a typical DIDO network consisting of active BTSs 1201 transmitting streams of bits to the UEs 1203 and inactive BTSs.

One key advantage of DIDO is its ability to dynamically reconfigure the network to adapt to the changing spatial distribution of the subscribers in a certain area and variable distribution of traffic over time. FIG. 12 shows a typical DIDO network consisting of active BTSs 1201 transmitting streams of bits to the UEs 1203 and inactive BTSs 1202 that are connected to the BSN but are not transmitting any data over the wireless link. The circle around the active BTSs indicate their coverage area. In this scenario, the UEs are uniformly distributed around the given area and the CP has activated all BTSs in the proximity of the UEs to guarantee good coverage.

Figure 13:
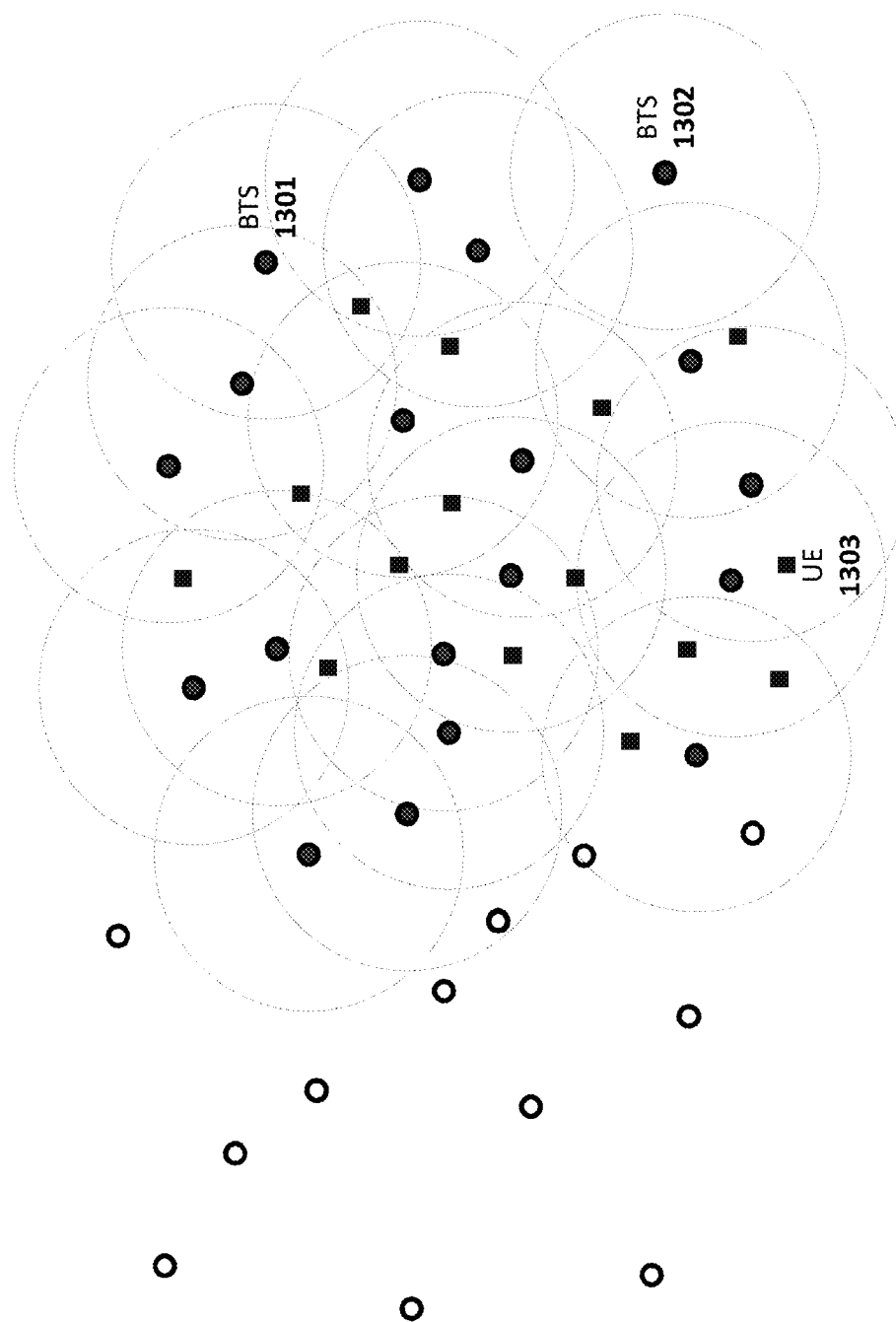
FIG. 13 illustrates one embodiment of all UEs may be moving to the same area.

During certain times of the day, however, the distribution of the UEs may change. For example, in the case of a public event, all UEs may be moving to the same area as depicted in FIG. 13. In this case, the CP recognizes the change in UE distributions and activates the BTSs in closer proximity to the UEs, while setting the others in standby. In one embodiment, the CP determines the pathloss from every BTSs to every UE base on the CSI feedback or any training or other control information sent from the UEs to the BTSs via the uplink wireless channel. Note that the number of active BTSs is kept constant as the UE configuration changes over time to guarantee there are enough degrees of freedom over the wireless link to create parallel non-interfering channels to all UEs. Moreover, setting some of the active BTSs to standby is one way to save power as well as keep computational complexity at the CP constant. In another embodiment, the active BTSs are not set to standby as the UE distribution changes, thereby guaranteeing better coverage at the expense of more power consumption and higher computational complexity at the CP.

Figure 14:
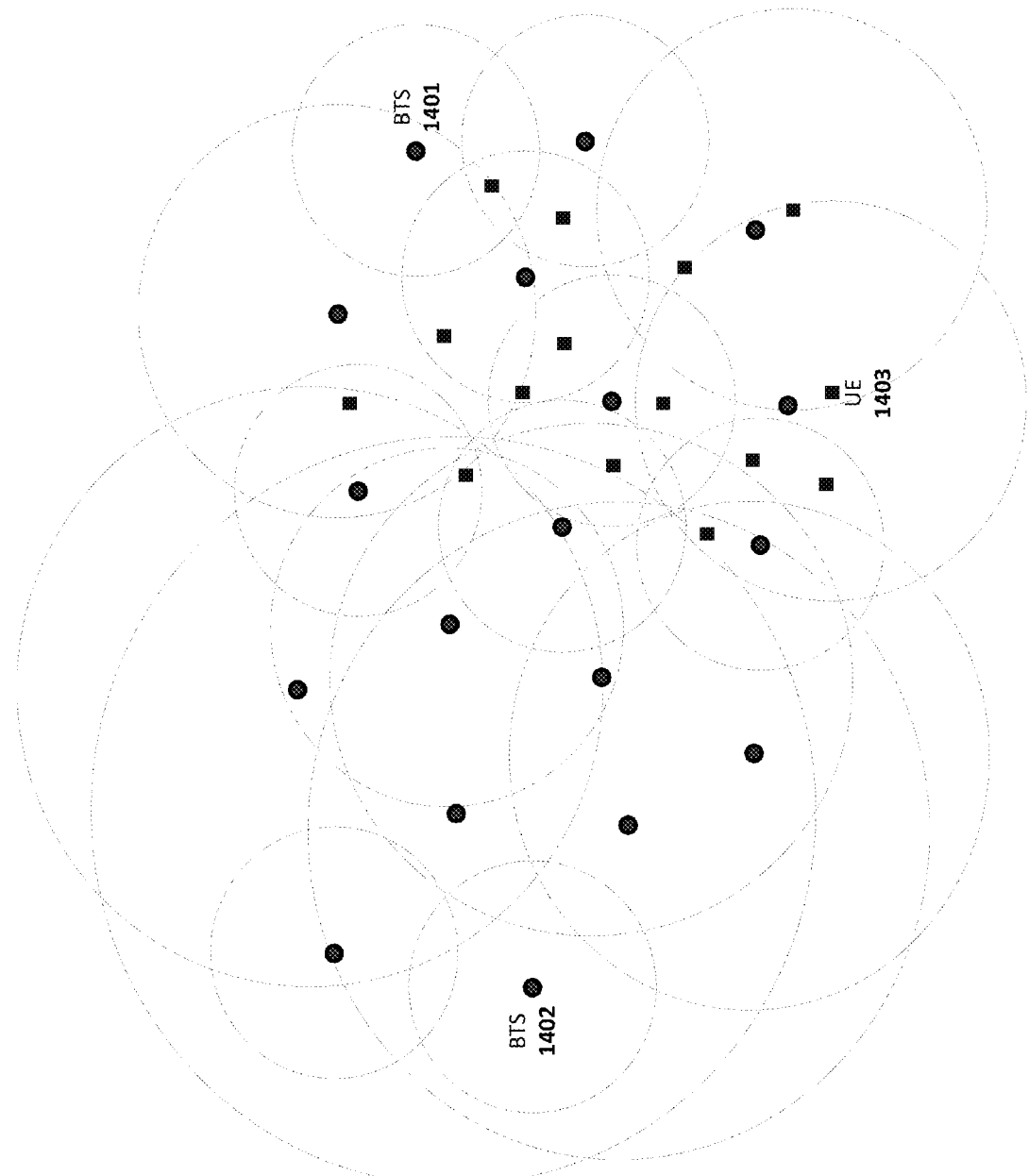
FIG. 14 illustrates one embodiment of power consumption is not an issue and there are no inactive BTSs in the neighborhood of the UEs that can be turned on, another solution is to increase the transmit power at the BTSs far away from the UE cluster

If power consumption is not an issue and there are no inactive BTSs in the neighborhood of the UEs that can be turned on, another solution is to increase the transmit power at the BTSs far away from the UE cluster, as shown in FIG. 14. Increasing transmit power creates more interfering patterns across BTSs that are exploited by the DIDO precoder to create non-interfering data streams.

4. REFERENCES

[1] Ubuquiti, "airMAX",
[2] Ubuquiti, "airFiber",
[3] MikroTik, "Routerboard",
[4] Ruckus wireless, "Long-range 802.11n Wi-Fi point-to-point/multipoint backhaul",
[5] DigitalAir wireless, "Outdoor wireless",
[6] DigitalAir wireless, "GeoDesy laser links 1.25 Gbps full duplex",
[7] Netsukuku,
[8] Webpass, "Buildings online"
[9] BelAir Networks, "Small cells"
[10] Morgan Stanley, "Mobile data wave: who dares to invest, wins", Jun. 13, 2012
[11] M. Costa, "Writing on dirty paper," *IEEE Transactions on Information Theory*, Vol. 29, No. 3, Page(s): 439-441, May 1983.
[12] G. Caire and S. Shamai, "On the achievable throughput of a multiantenna Gaussian broadcast channel," IEEE Trans. Info. Th., vol. 49, pp. 1691-1706, July 2003.
[13] Nihar Jindal & Andrea Goldsmith, "Dirty Paper Coding vs. TDMA for MIMO Broadcast Channels", IEEE Trans. on Information Theory, vol. 51, pp. 1783-1794, May 2005

[14] M. Tomlinson, "New automatic equalizer employing modulo arithmetic," *Electronics Letters*, Page(s): 138-139, March 1971.

[15] H. Miyakawa and H. Harashima, "A method of code conversion for digital communication channels with intersymbol interference," *Transactions of the Institute of Electronic*

[16] U. Erez, S. Shamai (Shitz), and R. Zamir, "Capacity and lattice-strategies for cancelling known interference," *Proceedings of International Symposium on Information Theory*, Honolulu, Hi., November 2000.

[17] W. Yu and J. M. Cioffi, "Trellis Precoding for the Broadcast Channel", IEEE Globecom, vol. 2, pp. 1344-1348, 2001

[18] B. M. Hochwald, C. B. Peel, and A. L. Swindlehurst, "A Vector-Perturbation Technique for Near-Capacity Multiantenna Multiuser Communication—Part I: Channel Inversion and Regularization", IEEE Trans. On Communications, vol. 53, n. 1, pp. 195-202, January 2005

[19] B. M. Hochwald, C. B. Peel, and A. L. Swindlehurst, "A Vector-Perturbation Technique for Near-Capacity Multiantenna Multiuser Communication—Part II: Perturbation", IEEE Trans. On Communications, vol. 53, n. 3, pp. 537-544, March 2005

[20] K. K. Wong, R. D. Murch, and K. B. Letaief, "A joint channel diagonalization for multiuser MIMO antenna systems," IEEE Trans. Wireless Comm., vol. 2, pp. 773-786, July 2003;

[21] R. Chen, R. W. Heath, Jr., and J. G. Andrews, "Transmit Selection Diversity for Unitary Precoded Multiuser Spatial Multiplexing Systems with Linear Receivers," *IEEE Trans. on Signal Processing*, vol. 55, no. 3, pp. 1159-1171, March 2007.

[22] R. A. Monziano and T. W. Miller, *Introduction to Adaptive Arrays*, New York: Wiley, 1980.

We claim:

1. A multiuser (MU) multiple antenna system (MAS) comprising:
   one or more centralized units communicatively coupled to multiple distributed transceiver stations via a network;
   the network consisting of wireline or wireless links or a combination of both, employed as a backhaul communication channel;
   the centralized unit transforming a first plurality of N data streams into a second plurality of M modulated streams, such that no single M modulated stream carries the complete data of any of the N data streams;
   the plurality of M modulated streams being sent over the network to the distributed transceiver stations;
   the distributed transceiver stations simultaneously sending the plurality of M modulated streams over wireless links to a plurality of client devices such that the combination of the plurality of M modulated streams as received at each client device location results in a modulated stream carrying the complete data of at least one of the plurality of N data streams.

2. The system as in claim 1 wherein the MU-MAS comprises a centralized processor (CP), the distributed transceiver station comprises a base transceiver station (BTS), the network comprises a base station network (BSN), the client device comprises user equipment (UE).

3. The system as in claim 2 wherein the wireless or wireline BSN interconnects multiple BTSs or controller (CTR) stations.

4. The system as in claim 2 wherein the wireless or wireline BSN interconnects one or more BTS access points (BTS-APs) or routers or switches to one or more BTS repeaters (BTS-RPs) or routers or switches.

5. The system as in claim 1 wherein the wireless link consists of point-to-point or point-to-multipoint line-of-sight links.

6. The system as in claim 5 wherein the wireless link employs commercially available or proprietary systems operating at radio frequencies or via optics communications.

7. The system as in claim 1 wherein the wireless link consists of point-to-point or point-to-multipoint non-line-of-sight links.

8. The system as in claim 7 wherein the wireless link employs beamforming, maximum ratio transmission (MRT), multiple-input multiple-output (MIMO) or other diversity techniques to improve link quality.

9. The system as in claim 2 wherein the BSN consists of a mesh network.

10. The system as in claim 9 wherein one or multiple BTSs are connected to the same mesh network, such that the BSN keeps connection to all other BTSs in case of failure of one or more BTSs.

11. The system as in claim 1 wherein compression techniques are used to reduce the amount of throughput required to transmit streams of bits over the network.

12. The system as in claim 2 wherein the BTSs broadcasts control information to some or all BTSs in the DIDO network to enable time and frequency synchronization for those BTSs.

13. The system as in claim 2 wherein the system is designed such that BTSs are positioned in any location.

14. The system as in claim 3 wherein multiple CTR stations employ maximum ratio combining (MRC), maximum ratio transmission (MRT), or any other diversity techniques to improve transmission and reception over their wireless links.

15. The system as in claim 2 wherein the BTS is powered using solar panels.

16. The system as in claim 2 wherein the BTS is powered using wireless power transfer.

17. The system as in claim 2 wherein the CP recognizes changes in distribution of the UEs over a certain area or their traffic over time and reconfigures the network by activating dynamically the BTSs that provide the best links to the UEs.

* * * * *